(12) United States Patent
Fujibayashi et al.

(10) Patent No.: US 8,127,077 B2
(45) Date of Patent: Feb. 28, 2012

(54) VIRTUAL PATH STORAGE SYSTEM AND CONTROL METHOD FOR THE SAME

(75) Inventors: Akira Fujibayashi, Sagamihara (JP); Shuji Nakamura, Yokohama (JP); Mutsumi Hosoya, Fujimi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/015,672

(22) Filed: Jan. 28, 2011

(65) Prior Publication Data

US 2011/0125964 A1 May 26, 2011

Related U.S. Application Data

(63) Continuation of application No. 12/534,733, filed on Aug. 3, 2009, now Pat. No. 7,895,396, which is a continuation of application No. 11/389,120, filed on Mar. 27, 2006, now Pat. No. 7,587,551.

(30) Foreign Application Priority Data

Feb. 2, 2006 (JP) ................................. 2006-025641

(51) Int. Cl.
*G06F 12/00* (2006.01)

(52) U.S. Cl. ........ 711/114; 711/147; 711/149; 711/165; 711/170

(58) Field of Classification Search .................. None
See application file for complete search history.

(56) References Cited

U.S. PATENT DOCUMENTS

| | | | |
|---|---|---|---|
| 6,898,202 B2 | 5/2005 | Gallagher et al. | |
| 6,985,914 B2 | 1/2006 | Venkatesh et al. | |
| 7,016,961 B2 | 3/2006 | Oeda et al. | |
| 7,076,691 B1 | 7/2006 | Dobberpuhl et al. | |
| 7,089,293 B2 | 8/2006 | Grosner et al. | |
| 7,275,050 B2 | 9/2007 | Fujimoto | |
| 2003/0158836 A1 | 8/2003 | Venkatesh et al. | |
| 2003/0172149 A1 | 9/2003 | Edsall et al. | |
| 2004/0103261 A1* | 5/2004 | Honda et al. .................. | 711/202 |
| 2004/0139365 A1* | 7/2004 | Hosoya ............................ | 714/5 |

(Continued)

FOREIGN PATENT DOCUMENTS

GB 2406406 3/2005

(Continued)

OTHER PUBLICATIONS

European Search Report in EP 06253156.1, dated Jun. 30, 2009.

(Continued)

*Primary Examiner* — Shawn X Gu
(74) *Attorney, Agent, or Firm* — Antonelli, Terry, Stout & Kraus, LLP.

(57) ABSTRACT

Provided is a storage system. The storage system includes: a hard disk drive, and a storage controller for reading/writing data from/to the hard disk drive, the storage controller including: at least one interface connected to a host computer through a network; and a plurality of processors connected to the interface through an internal network. The storage system is characterized in that: the processor provides at least one logical access port to the host computer; and the interface stores routing information including a processor which processes an access request addressed to the logical access port, extracts an address from the received access request upon reception of the access request from the host computer, specifies the processor which processes the received access request based on the routing information and the extracted address, and transfers the received access request to the specified processor.

12 Claims, 20 Drawing Sheets

U.S. PATENT DOCUMENTS

| | | |
|---|---|---|
| 2004/0221105 A1 | 11/2004 | Fujimoto et al. |
| 2005/0050271 A1 | 3/2005 | Honda et al. |
| 2005/0081124 A1 | 4/2005 | Luick |

FOREIGN PATENT DOCUMENTS

| | | |
|---|---|---|
| JP | 08-328760 | 12/1996 |
| JP | 2003-345515 A | 12/2003 |
| JP | 2004-139379 | 5/2004 |
| JP | 2004-213125 | 7/2004 |
| JP | 2004-240949 | 8/2004 |
| JP | 2005-525619 | 8/2005 |
| WO | WO03/062979 | 7/2003 |

OTHER PUBLICATIONS

"Symmetric DMX Architecture Product Description," EMC Corporation, 2004.

Office Action in Japanese Patent Application No. 2006-025641, issued Mar. 17, 2011 and mailed Mar. 29, 2011, {in Japanese, 3 pgs.} [with English language concise explanation/translation].

Examination Report in EP 06253156.1-1245, dated Sep. 13, 2011 (6 pgs.).

Office Action in Japanese Patent Appln. 2006-025641, dated Jun. 28, 2011 (with English language translation).

* cited by examiner

| LOGICAL ACCESS PORT ID | ADDRESS | | | IDENTIFICATION INFORMATION |
|---|---|---|---|---|
| | MAC ADDRESS | IP ADDRESS | PORT NUMBER | |
| 0 | 10:00:00:00:87:11:21:31 | 192.168.0.100 | 3260 | iqn.2002-10.com.hoge:iscsi-001 |
| 1 | 10:00:00:00:87:11:21:32 | 192.168.0.200 | 3260 | iqn.2002-10.com.hoge:iscsi-002 |
| 2 | 10:00:00:00:87:11:21:33 | 192.168.0.111 | 3260 | iqn.2002-10.com.hoge:iscsi-003 |
| 3 | 10:00:00:00:87:11:21:34 | 192.168.0.112 | 3260 | iqn.2002-10.com.hoge:iscsi-004 |

| LOGICAL ACCESS PORT ID | MP | |
|---|---|---|
| | MP GRP ID | INTERNAL ADDRESS |
| 0 | 0 | 4B000052 |
| 1 | 1 | 4B000053 |
| 2 | 2 | 4B000054 |
| 3 | 2 | 4B000054 |

| LOGICAL ACCESS PORT ID | PHYSICAL PORT | | |
|---|---|---|---|
| | PHYSICAL PORT GRP ID | PHYSICAL PORT GRP NAME | PHYSICAL PORT ID |
| 0 | 0 | A | 0,1,2,3 |
| 1 | 1 | B | 4 |
| 2 | 2 | C | 5 |
| 3 | 2 | D | 6 |

| LOGICAL ACCESS PORT ID | LUN | LOGICAL DEVICE ID | LBA |
|---|---|---|---|
| 0 | 0 | 20 | 0x000-0x100 |
| 1 | 1 | 30 | 0x000-0x100 |
| 2 | 2 | 25 | 0x000-0x100 |
| 3 | 3 | 40 | 0x000-0x100 |
| 3 | 4 | 60 | 0x000-0x100 |
| 3 | 6 | 50 | 0x000-0x100 |

| IP ADDRESS | PORT NUMBER | LUN | LBA | MP GRP ID | TRANSFER DESTINATION INTERNAL ADDRESS |
|---|---|---|---|---|---|
| 192.168.0.100 | 3260 | 0 | 0x000 – 0x100 | 0 | 4B000052 |
| 192.168.0.200 | 3260 | 0 | 0x000 – 0x100 | 1 | 4B000053 |

| LOGICAL ACCESS PORT ID | ADDRESS | |
|---|---|---|
| | WWN | PORT ADDRESS |
| 0 | 10:00:00:00:87:00:1F:01 | 0x700001 |
| 1 | 10:00:00:00:87:00:1F:02 | 0x700002 |
| 2 | 10:00:00:00:87:00:1F:03 | 0x700003 |
| 3 | 10:00:00:00:87:00:1F:04 | 0x700004 |

| PORT ADDRESS | WWN | LUN | LBA | MP GRP ID | TRANSFER DESTINATION INTERNAL ADDRESS |
|---|---|---|---|---|---|
| 0x700001 | 10:00:00:00:87:00:1F:01 | 0 | 0x000-0x100 | 0 | 4B000052 |
| 0x700002 | 10:00:00:00:87:00:1F:02 | 0 | 0x000-0x100 | 1 | 4B000053 |

| LOGICAL DEVICE ID | EXTERNAL STORAGE ID | ACCESS PORT ID | ACCESS DESTINATION LUN |
|---|---|---|---|
| 25 | 5 | 8 | 12 |
| 70 | 3 | 3 | 02 |
| 75 | 4 | 3 | 03 |
| 80 | 6 | 3 | 05 |

| PORT ADDRESS | WWN | LUN | LBA | MP GRP ID | TRANSFER DESTINATION INTERNAL ADDRESS | LOGICAL DEVICE ID | EXTERNAL STORAGE ID | ACCESS DESTINATION LUN | ACCESS PORT ID |
|---|---|---|---|---|---|---|---|---|---|
| 0x700001 | 10:00:00:00:87:00:1F:01 | 0 | 0x000 - 0x100 | 0 | 4B000052 | 20 | | | |
| 0x700002 | 10:00:00:00:87:00:1F:02 | 0 | 0x000 - 0x100 | 1 | 4B000053 | 30 | | | |
| 0x700003 | 10:00:00:00:87:00:1F:03 | 0 | 0x000 - 0x100 | 1 | 4B000050 | 25 | 5 | 12 | 8 |

FIG. 18

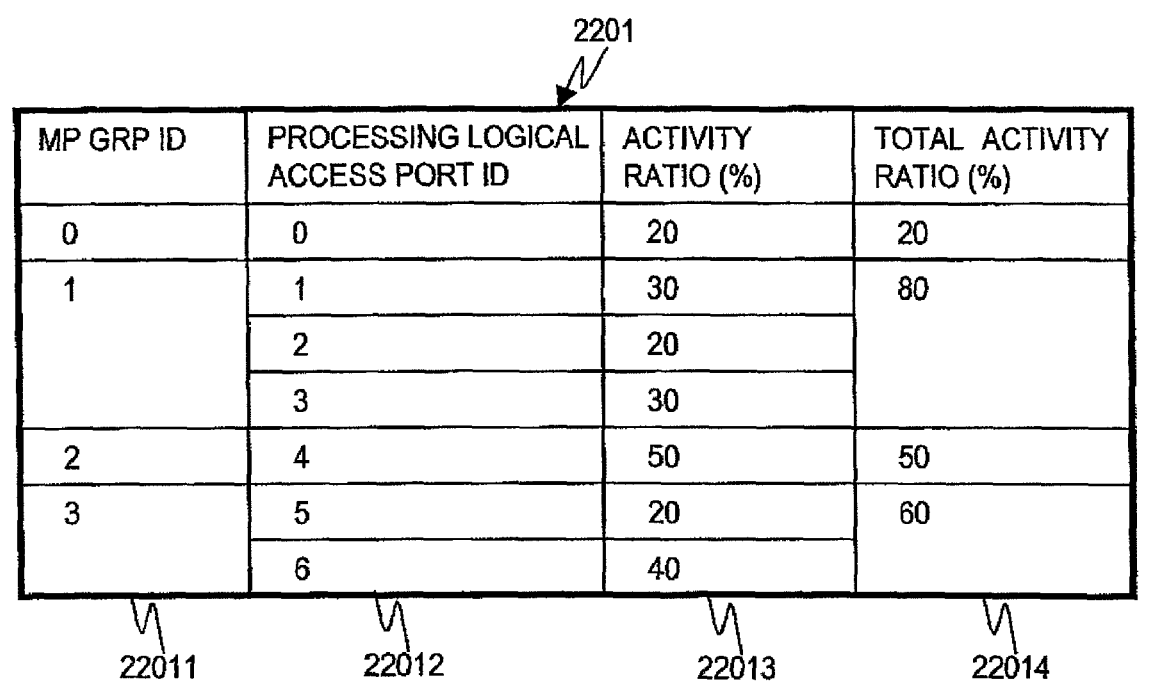

| MP GRP ID | PROCESSING LOGICAL ACCESS PORT ID | ACTIVITY RATIO (%) | TOTAL ACTIVITY RATIO (%) |
|---|---|---|---|
| 0 | 0 | 20 | 20 |
| 1 | 1 | 30 | 80 |
|  | 2 | 20 |  |
|  | 3 | 30 |  |
| 2 | 4 | 50 | 50 |
| 3 | 5 | 20 | 60 |
|  | 6 | 40 |  |

FIG. 22

VIRTUAL PATH STORAGE SYSTEM AND CONTROL METHOD FOR THE SAME

CROSS-REFERENCE TO RELATED APPLICATIONS

This application is a continuation of U.S. application Ser. No. 12/534,733, filed Aug. 3, 2009 (now U.S. Pat. No. 7,895, 396), which, in turn, is a continuation of U.S. application Ser. No. 11/389,120, filed Mar. 27, 2006 (now U.S. Pat. No. 7,587, 551), and which application claims priority from Japanese patent application P2006-025641 filed on Feb. 2, 2006, the entire contents of which are hereby incorporated by reference into this application.

BACKGROUND

This invention relates to a storage system which includes a hard disk drive and a storage controller, and more particularly, to a technology of processing an access request by the storage controller.

Representative access interfaces for a storage system include a fibre channel (FC), and Ethernet. The fibre channel and the Ethernet have become popular as elements for constituting a storage area network (SAN). The SAN constituted of the fibre channel may be called an FC-SAN, while the SAN constituted of the Ethernet may be called an IP-SAN.

For example, transfer efficiency of one physical port in the FC-SAN is 2.4 Gbps or the like. Transfer efficiency of one physical port in the IP-SAN is 1 Gbps, 10 Gbps, or the like.

An application executed by a host computer requests access of high throughput and high transaction to the storage system. Thus, one physical path cannot provide transfer efficiency required by the application. Hence, the host computer uses a plurality of physical paths to access the storage system. In this case, a multipath I/O, a link aggregation, or the like is used.

A technology of controlling a large storage system is disclosed in "Symmetric DMX Architecture Product Description Guide", EMC Corporation, 2004. According to this technology, each physical port included in the storage system is controlled by one or two processors. The processor processes an access request received from a host computer through the physical port. Further, the processor controls data in a cache memory. In other words, many processors included in the storage system operate in parallel to control the entire storage system.

A conventional storage system includes a controller and a hard disk drive. The controller includes a SAN, a front-end interface unit, a processor, a cache memory, a memory, a back-end interface unit, and an internal network. The controller provides a storage area of the hard disk drive as a logical volume to a host computer.

The SAN is a network to interconnect the host computer and the storage system. The front-end interface unit includes a physical port connected to the SAN. A plurality of front-end interface units are included in the storage system.

The processor controls the front-end interface unit. The processor may be included inside or outside the front-end interface unit. The cache memory temporarily stores information containing an access request transmitted from the host computer.

The memory is used as a shared memory to store control information of the storage system. The back-end interface unit is connected to the hard disk drive. The internal network connects the components included in the controller to each other.

The front-end interface unit receives the access request from the host computer. Then, the processor processes the access request received by the front-end interface unit while referring to or updating the control information stored in the memory. Accordingly, the storage system can process the access request while maintaining consistency in processing and cache.

SUMMARY

In the case of the storage system of the conventional art, when data stored in the logical volume is accessed through the plurality of physical ports, or when one access request is processed by using a plurality of physical ports, access performance deteriorates.

In this case, each processor processes the access request received through each physical port in cooperation with the other processors through communication with the shared memory and the other processors. Thus, the processor can process the access request while maintaining consistency in processing and cache. However, the communication between the processor and the shared memory and the communication between the processors impose a great burden on the internal network. As a result, the conventional storage system cannot provide transfer efficiency required by the application. Besides, because of a larger difference between a speed of processing data by the processor and a speed of accessing the outside by the processor, the communication between the processor and the shared memory and the communication between the processors become bottlenecks in processing of the storage system.

This invention has been made in view of the above problems, and it is an object of the invention to provide a storage system of high access performance.

According to an exemplary embodiment of this invention, there is provided a storage system, comprising: a hard disk drive; and a storage controller for reading/writing data from/ to the hard disk drive, the storage controller comprising: at least one interface connected to a host computer through a external network; and a plurality of processors connected to the interface through an internal network, wherein: the processor provides at least one logical access port to the host computer; and the interface stores routing information indicating the processor which processes an access request addressed to the logical access port, extracts an address from the received access request upon reception of the access request from the host computer, specifies the processor which processes the received access request based on the routing information and the extracted address, and transfers the received access request to the specified processor.

According to the exemplary embodiment of this invention, it is possible to improve the access performance of the storage system.

BRIEF DESCRIPTION OF THE DRAWINGS

The present invention can be appreciated by the description which follows in conjunction with the following figures, wherein:

FIG. 5 is a diagram showing a structure of a logical access port configuration table stored in the processor unit of the first embodiment of this invention;

FIG. 6 is a diagram showing a structure of a logical access port-processor mapping table stored in the processor unit of the first embodiment of this invention;

FIG. 7 is a diagram showing a structure of a logical access port-physical port mapping table stored in the processor unit of the first embodiment of this invention;

FIG. 8 is a diagram showing a structure of a volume management table stored in the processor unit of the first embodiment of this invention;

FIG. 9 is a diagram showing a structure of a routing table stored in the interface unit of the first embodiment of this invention;

FIG. 14 is a diagram showing a structure of the logical access port configuration table stored in the processor unit of the second embodiment of this invention;

FIG. 15 is a diagram showing a structure of the routing table stored in the interface unit of the second embodiment of this invention;

FIG. 17 is a diagram showing a structure of a logical device configuration management table stored in the processor unit of the third embodiment of this invention;

FIG. 18 is a diagram showing a structure of a routing table stored in the interface unit of the third embodiment of this invention;

FIG. 22 is a diagram showing a structure of a load management table stored in the processor unit according to the fourth embodiment of this invention;

DETAILED DESCRIPTION OF THE PREFERRED EMBODIMENTS

Hereinafter, preferred embodiments of this invention will be described with reference to the accompanying drawings.

First Embodiment

Figure 1:
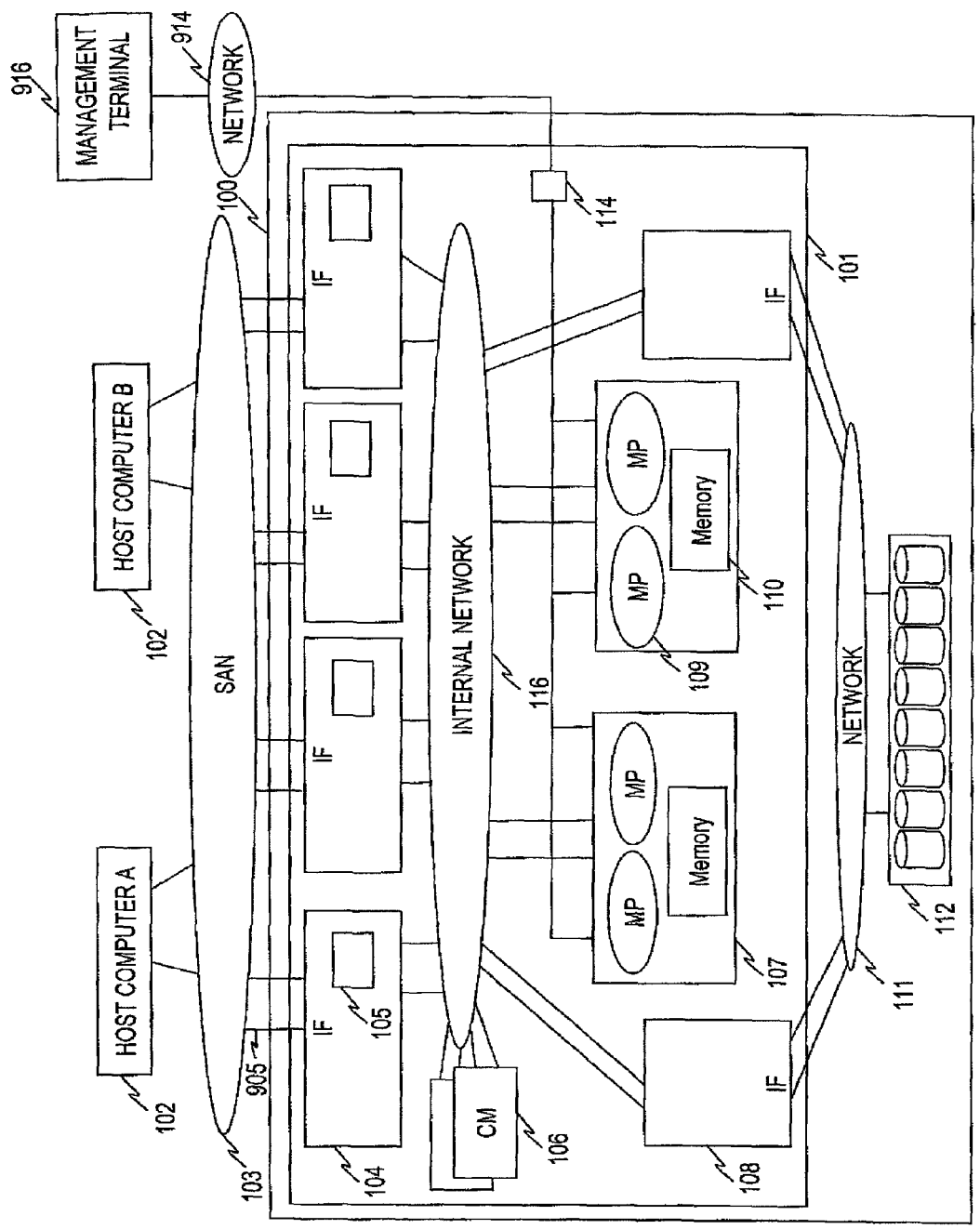
FIG. 1 is a block diagram showing a configuration of a computer system according to a first embodiment of this invention.

FIG. 1 is a block diagram showing a configuration of a computer system according to a first embodiment of this invention.

The computer system includes a storage system 100, a host computer 102, a SAN 103, a management network 914, and a management terminal 916.

The host computer 102 includes a processor, a memory, and an interface. The host computer 102 transmits an access request to the storage system 100. The host computer 102 receives a processing result of the access request from the storage system 100. The access request is a reading or writing request. FIG. 1 shows two host computers 102, but there are no restrictions on the number of host computers 102.

The SAN 103 is a network for interconnecting the storage system 100 and the host computer 102. The SAN 103 is constituted by a fibre channel or Ethernet. This embodiment will be described by way of a case where the SAN 103 is constituted by Ethernet.

The management terminal 916 includes a processor, a memory, and an interface. The management terminal 916 is operated by an administrator of the computer system. The management terminal 916 controls the storage system 100 based on information inputted by the administrator.

The storage system 100 includes a storage controller 101, a network 111, and a hard disk drive 112.

The network 111 interconnects the storage controller 101 and the hard disk drive 112. For example, the network 111 is an FC-AL. It should be noted that any type of network 111 can be employed as long as the network 111 can interconnect the storage controller 101 and the hard disk drive 112.

The hard disk drive 112 stores data requested to be written by the host computer 102. The storage system 100 of FIG. 1 has eight hard disk drives 112. However, any number of hard disk drives 112 can be set. According to this embodiment, the hard disk drive 112 is a magnetic hard disk drive. However, in place of the magnetic hard disk drive, the storage system 100 may include a tape library, an optical disk library, a semiconductor hard disk drive, a flash memory array, a DVD library, or the like as a storage medium.

The storage controller 101 provides a storage area of the hard disk drive 112 as a logical volume (LU) to the host computer 102.

The storage controller 101 reads data from the hard disk drive 112 according to a reading request received from the host computer 102. The storage controller 101 writes data in the hard disk drive 112 according to a writing request received from the host computer 102.

The storage controller 101 includes an interface unit 104, a cache memory (CM) 106, a processor (MP) unit 107, a back-end interface unit 108, a memory 110, a control unit 114, and an internal network 116.

The interface unit 104 includes a routing function unit 105 and a physical port 905. The physical port 905 is an interface connected to the outside of the storage system 100. According to this embodiment, the physical port 905 is connected to the SAN 103. The interface unit 104 is connected to the internal network 116.

The interface unit 104 receives the reading or writing request from the host computer 102. Then, the routing function unit 105 of the interface unit 104 decides a processor unit 107 which becomes a transfer destination of the received reading or writing request. The interface unit 104 transmits the reading or writing request to the decided processor unit 107. The interface unit 104 transmits a processing result of the reading or writing request to the host computer 102.

The back-end interface unit 108 is connected to the internal network 116 and the network 111. The back-end interface unit 108 reads/writes data from/to the hard disk drive 112.

Figure 3:
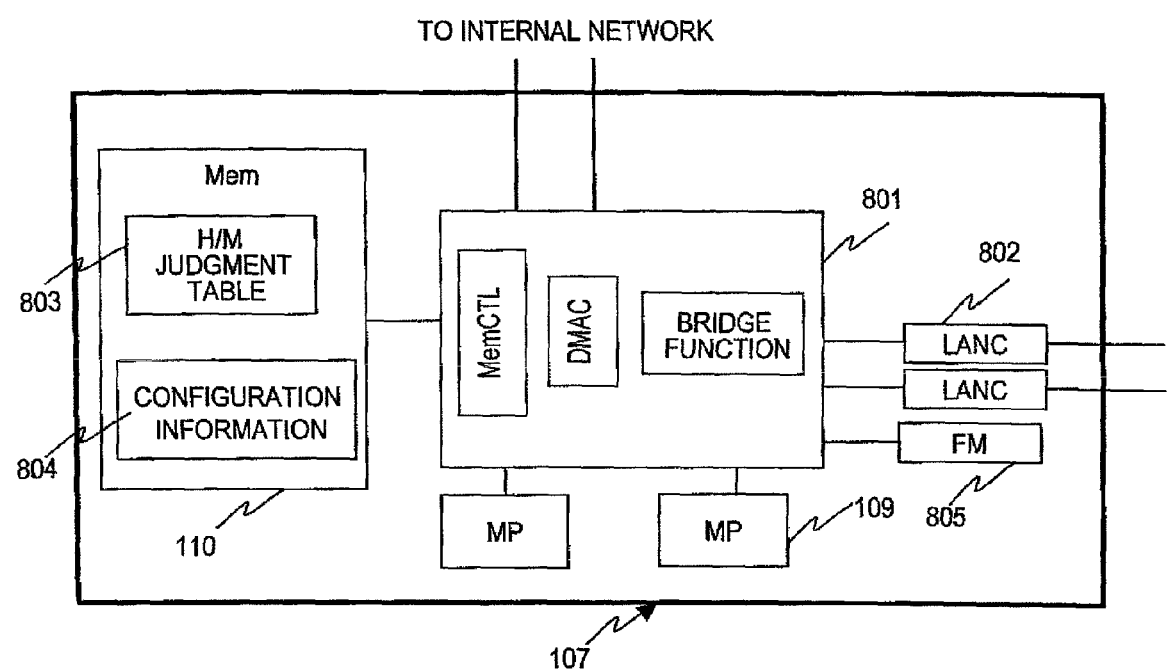
FIG. 3 is a block diagram showing a configuration of the processor unit included in the storage controller of the first embodiment of this invention.

The processor unit 107 includes a processor (MP) 109 and a memory 110. In FIG. 1, one processor unit 107 includes two processors 109, but may include any number of processors 109. Similarly, one processor unit 107 includes one memory 110, but may include any number of memories 110. Referring to FIG. 3, the processor unit 107 will be described in detail.

The memory 110 stores information regarding a configuration of the storage system 100 or other such information.

The processor unit 107 controls the entire storage controller 101. Specifically, the processor unit 107 receives the reading or writing request from the routing function unit 105 of the interface unit 104. Then, the processor 109 of the processor unit 107 analyzes the received reading or writing request by referring to the information stored in the memory 110. The processor 109 of the processor unit 107 processes received reading or writing request.

Additionally, the processor unit 107 controls the interface unit 104 and the back-end interface unit 108.

The cache memory 106 temporarily stores data. Specifically, the cache memory 106 temporarily stores data to be written in the hard disk drive 112. In addition, the cache memory 106 temporarily stores data read from the hard disk drive 112.

The control unit 114 is connected to the processor unit 107 through a communication channel of a LAN or the like. The control unit 114 is connected to the management terminal 916 through the management network 914. The control unit 114 controls the processor unit 107 based on information received from the management terminal 916. Accordingly, the control unit 114 controls the storage controller 101.

In the drawing, the interface unit 104, the back-end interface unit 108, the cache memory 106, and the memory 110 of the processor unit 107 are duplicated or made redundant.

Figure 2:
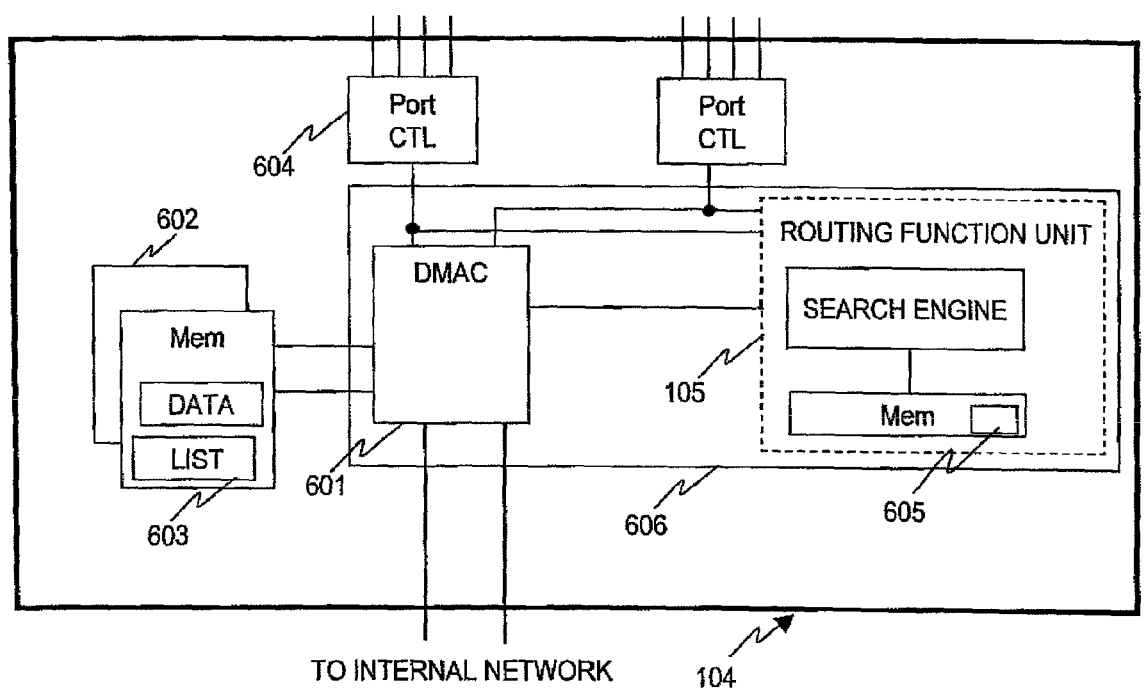
FIG. 2 is a block diagram showing a configuration of the interface unit included in the storage controller of the first embodiment of this invention.

FIG. 2 is a block diagram showing a configuration of the interface unit 104 included in the storage controller 101 of the first embodiment of this invention.

The interface unit 104 includes a port controller unit 604, an interface control unit 606, and a memory 602.

The port controller unit 604 includes one or more physical ports 905. The port controller unit 604 receives a packet from the outside by controlling the physical port 905.

The interface control unit 606 includes a DMA controller unit (DMAC) 601 and a routing function unit 105.

The DMAC 601 controls transfer of the packet received by the port controller unit 604. The DMAC 601 controls transfer of a packet stored in the cache memory 106.

The routing function unit 105 includes a search engine and a memory. The memory of the routing function unit stores a routing table 605. The routing table 605 shows a correspondence between the packet received by the port controller unit 604 and the processor unit 107 which becomes a transfer destination of the packet. The processor unit 107 adds or deletes a record of the routing table 605 depending on the configuration, the situation, or the like of the storage system 100. Accordingly, the processor unit 107 updates the routing table 605.

The search engine refers to the routing table 605 to retrieve the processor unit 107 which becomes a transfer destination of the packet received by the port controller unit 604. For example, the search engine retrieves the processor unit 107 which becomes a transfer destination of the packet received by the port controller unit 604 based on an address of the packet, a identifier of an access destination logical volume, or an access destination logical block address.

The memory 602 temporarily stores the packet received/transmitted by the interface unit 104. The memory 602 stores a transfer parameter list 603. The transfer parameter list 603 is information used by the DMAC 601 to transfer the packet.

The back-end interface unit 108 is similar in configuration to the interface unit 104 of FIG. 2. Thus, description of the back-end interface unit 108 will be omitted.

FIG. 3 is a block diagram showing a configuration of the processor unit 107 included in the storage controller 101 of the first embodiment of this invention.

The processor unit 107 includes a processor control unit 801, a LAN controller unit (LANC) 802, a flash memory (FM) 805, a processor 109, and a memory 110.

For example, the processor unit 801 is a chip set. Specifically, the processor control unit 801 includes a memory controller, a DMAC, and a bridge function unit. The memory controller controls the memory 110. The DMAC controls access to the memory 110. The bridge function unit relays a packet.

The LANC 802 is connected to the control unit 114 through the LAN.

The memory 110 stores, for example, a program executed by the processor 109, and information used by the processor 109. Specifically, the memory 110 stores a cache hit mistake judgment table 803 and configuration information 804. A part of the memory 110 is used as a queue for storing an access request packet received by the processor unit 107.

The cache hit mistake judgment table 803 shows data cached in the cache memory 106 among the data stored in the hard disk drive 112.

The configuration information 804 concerns a configuration of the storage system 100. The configuration information 804 contains a logical access port configuration table, a logical access port-processor mapping table, a logical access port-physical port mapping table, a volume management table, and the like.

The configuration information 804 is set by the administrator. Specifically, the control unit 114 receives information input by the administrator through the management terminal 916. Then, the control unit 114 creates or updates the configuration information 804 stored in the memory 110.

Figure 4:
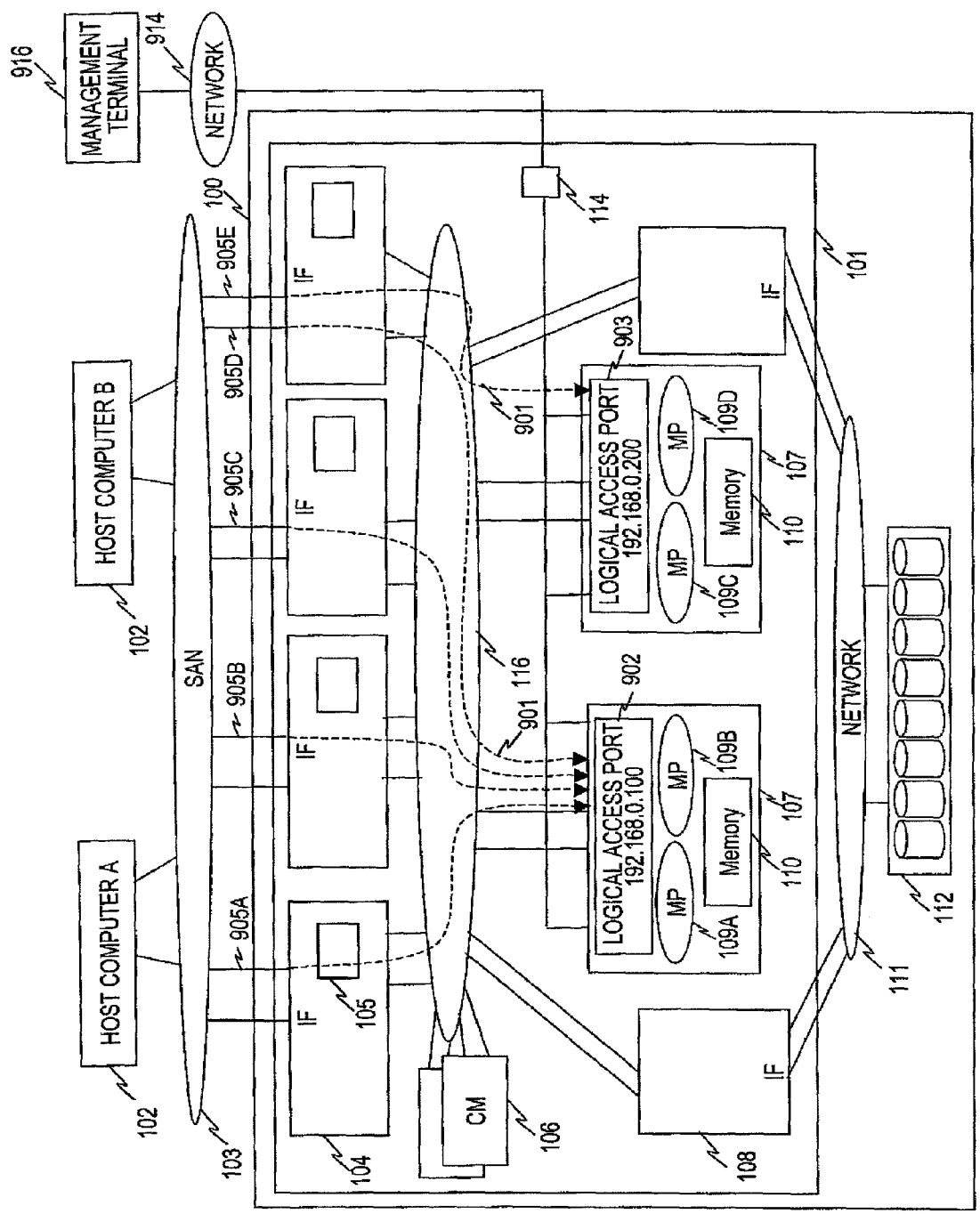
FIG. 4 is an explanatory diagram of the logical access port according to the first embodiment of this invention.

The logical access port configuration table is information regarding a configuration of a logical access port. Referring to FIG. 5, the logical access port configuration table will be described in detail. Referring to FIG. 4, the logical access port will be described.

The logical access port-processor mapping table shows a correspondence between the logical access port and the processor 109 which processes a packet addressed to the logical access port. Referring to FIG. 6, the logical access port-processor mapping table will be described in detail.

The logical access port-physical port mapping table shows a correspondence between the logical access port and a physical port 905. Referring to FIG. 7, the logical access port-physical port mapping table will be described in detail.

The volume management table shows information regarding a logical volume (LU) of the storage system 100.

The flash memory 805 stores a boot program.

FIG. 4 is an explanatory diagram of the logical access port according to the first embodiment of this invention.

According to this embodiment, host computers 102A and 102B can access physical ports 905A, 905B, 905C, 905D, and 905E of the storage system 100.

The processor unit 107 provides logical access ports 902 and 903 to the host computer 102. Specifically, the administrator inputs information regarding settings of the logical access ports 902 and 903 to the management terminal 916. Then, the management terminal 916 transmits the input information to the control unit 114 through the management network 914. The management network 914 sets the logical access ports 902 and 903 in the processor unit 107 based on the received information.

According to this embodiment, the processor unit 107 equipped with processors 109A and 109B provides the logical access port 902 to the host computer 102. The logical access port 902 is an iSCSI access interface accessed from the physical ports 905A, 905B, 905C, and 905D. An IP address of the logical access port 902 is 192.168.0.100.

The processor unit 107 equipped with processors 109C and 109D provides the logical access port 903 to the host computer 102. The logical access port 903 is an iSCSI access interface accessed from the physical port 905E. An IP address of the logical access port 903 is 192.168.0.200. The logical access ports 902 and 903 may be FC access interfaces.

A plurality of logical access ports 903 and 904 may be set in one processor unit 107. One logical access port may be set in a plurality of processor units 107.

A dotted line 901 indicates a logical access path set between the physical port 905 and the logical access ports 902 and 903.

The host computer 102 accesses the logical access ports 902 and 903 to access the storage system 100.

FIG. 5 is a diagram showing a structure of a logical access port configuration table 1201 stored in the processor unit 107 of the first embodiment of this invention.

The logical access port configuration table 1201 contains a logical access port ID 12011, a MAC address 12012, an IP address 12013, a port number 12014, and identification information 12015.

The logical access port ID 12011 is an identifier for uniquely identifying each of the logical access ports 902 and 903 in the storage system 100.

The MAC address 12012 is a MAC address of each of the logical access ports 902 and 903 identified by the logical access port ID 12011 of a relevant record. The IP address 12013 is an IP address of each of the logical access ports 902 and 903 identified by the logical access port ID 12011 of the record. The port number 12014 is a port number of each of the logical access ports 902 and 903 identified by the logical access port ID 12011 of the record.

The identification information 12015 is information for identifying each of the logical access ports 902 and 903 identified by the logical access port ID 12011 of the record by the host computer 102. For example, the identification information 12015 is an iSCSI name of each of the logical access ports 902 and 903 identified by the logical access port ID 12011 of the record.

FIG. 6 is a diagram showing a structure of a logical access port-processor mapping table 1301 stored in the processor unit 107 of the first embodiment of this invention.

The logical access port-processor mapping table 1301 contains a logical access port ID 13011, a processor group ID 13012 and an internal address 13013.

The logical access port ID 13011 is an identifier for uniquely identifying each of the logical access ports 902 and 903 in the storage system 100.

The processor group ID 13012 is a unique identifier of a processor group for controlling each of the logical access ports 902 and 903 identified by the logical access port ID 13011 of the record. In other words, the processor group ID 13012 is a unique identifier of a processor group for processing a packet addressed to each of the logical access ports 902 and 903 identified by the logical access port ID 13011 of the record. The processor group includes one or more processors 109.

The internal address 13013 is an address of the processor group identified by the processor group ID 13012 of the record in the storage system 100.

FIG. 7 is a diagram showing a structure of a logical access port-physical port mapping table 1401 stored in the processor unit 107 of the first embodiment of this invention.

The logical access port-physical port mapping table 1401 contains a logical access port ID 14011, a physical port group ID 14012, a physical port group name 14013, and a physical port ID 14014.

The logical access port ID 14011 is an identifier for uniquely identifying each of the logical access ports 902 and 903 in the storage system 100.

The physical port group ID 14012 is a unique identifier of a physical port group having a logical access path set with each of the logical access ports 902 and 903 identified by the logical access port ID 14011 of the record. The physical port group includes one or more physical ports 905.

The physical port group name 14013 is a name of a physical port group identified by the physical port group ID 14012 of the record. The administrator identifies the physical port group based on the physical port group name 14013.

For example, a key number of a link aggregation control protocol (LACP) is used for the physical port group name. In this case, switch devices constituting the host computer 102 and the SAN 103 correspond to the LACP.

The physical port ID 14014 is a unique identifier of a physical port 905 having a logical access path set with each of the logical access ports 902 and 903 identified by the logical access port ID 14011 of the record.

FIG. 8 is a diagram showing a structure of a volume management table 1801 stored in the processor unit 107 of the first embodiment of this invention.

The volume management table 1801 contains a logical access port ID 18011, an LUN 18012, a logical device ID 18013, and an LBA 18014.

The logical access port ID 18011 is an identifier for uniquely identifying each of the logical access ports 902 and 903 in the storage system 100.

The LUN 18012 is a unique identifier of a logical volume (LU) accessed from each of the logical access ports 902 and 903 identified by the logical access port ID 18011 of the record.

The logical device ID 18013 is a unique identifier of a logical device (LDEV) constituting the LU identified by the LUN 18012 of the record. The LBA 18014 is an address of a block accessed from each of the logical access ports 902 and 903 identified by the logical access port ID 18011 of the record.

FIG. 9 is a diagram showing a structure of a routing table 605 stored in the interface unit 104 of the first embodiment of this invention.

The routing table 605 contains an IP address 6051, a port number 6052, an LUN 6053, an LBA 6054, a processor group ID 6055, and a transfer destination internal address 6056.

The IP address 6051 is an IP address of each of the logical access ports 902 and 903. The port number 6052 is a port number of each of the logical access ports 902 and 903.

The LUN 6053 is a unique identifier of a logical volume (LU) accessed from each of the logical access ports 902 and 903 identified by the IP address 6051 and the port number 6052 of the record.

The LBA 6054 is an address of a block accessed from each of the logical access ports 902 and 903 identified by the IP address 6051 and the port number 6052 of the record.

The LUN 6053 and the LBA 6054 do not need to be contained in the routing table 605. In this case, the interface unit 104 specifies a processor group which becomes a transfer destination of a packet based solely on the IP address 6051 and the port number 6052.

The processor group ID 6055 is unique identifier of a processor group for processing a packet addressed to each of the logical access ports 902 and 903 identified by the IP address 6051 and the port number 6052 of the record.

The transfer destination internal address 6056 is an internal address of the processor group identified by the processor group ID 6055 of the record in the storage system 100. In other words, the transfer destination internal address 6056 is an internal address of the processor group to which the packet addressed to each of the logical access ports 902 and 903 identified by the IP address 6051 and the port number 6052 of the record is transferred.

Next, processing of creating or updating the routing table 605 will be described.

The processor unit 107 creates or updates the routing table 605 based on the logical access port configuration table 1201 of FIG. 5, the logical access port-processor mapping table 1301 of FIG. 6, the logical access port-physical port mapping table 1401 of FIG. 7, and the volume management table 1801 of FIG. 8.

Specifically, the processor unit 107 specifies a logical access port whose information is to be updated. Then, the processor unit 107 selects, from the logical access port configuration table 1201, a record having a logical access port ID 12011 of the logical access port configuration table 1201 that matches an identifier of the specified logical access port. The processor unit 107 extracts an IP address 12013 and a port number 12014 from the selected record.

Next, the processor unit 107 stores the extracted IP address 12013 in the IP address 6051 of the routing table 605. Further, the processor unit 107 stores the extracted port number 12014 in the port number 6052 of the routing table 605.

Then, the processor unit 107 selects, from the volume management table 1801, a record having a logical access port ID 18011 of the volume management table 1801 that matches an identifier of the specified logical access port. The processor unit 107 extracts an LUN 18012 and an LBA 18014 from the selected record.

Next, the processor unit 107 stores the extracted LUN 18012 in the LUN 6053 of the routing table 605. Further, the processor unit 107 stores the extracted LBA 18014 in the LBA 6054 of the routing table 605.

Then, the processor unit 107 selects, from the logical access port-processor mapping table 1301, a record having a logical access port ID 13011 of the logical access port-processor mapping table 1301 that matches an identifier of the specified logical access port. The processor unit 107 extracts a processor group ID 13012 and an internal address 13013 from the selected record.

Next, the processor unit 107 stores the extracted processor group ID 13012 in the processor group ID 6055 of the routing table 605. Further, the processor unit 107 stores the extracted internal address 13013 in the transfer destination internal address 6056 of the routing table 605.

As described above, the processor unit 107 updates or creates the routing table 605 stored in the interface unit 104.

Next, processing to be performed when the storage system 100 receives an access request packet 300 from the host computer 102 be described.

Figure 10:
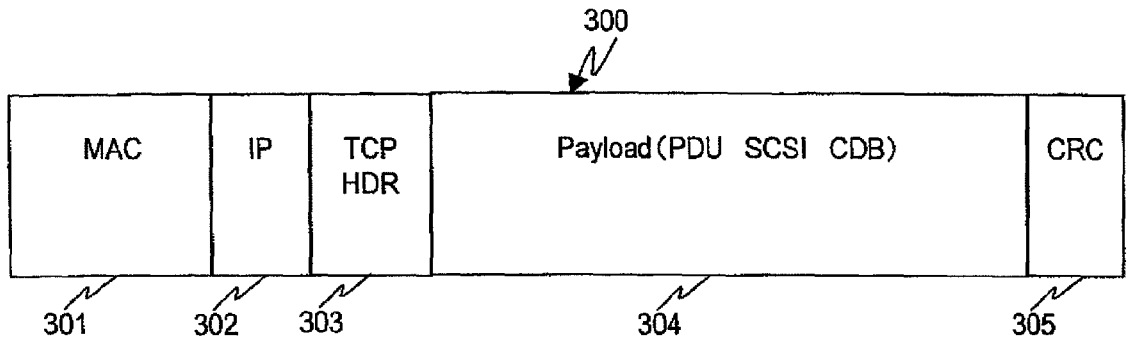
FIG. 10 is an explanatory diagram of the access request packet according to the first embodiment of this invention which is transmitted to the storage system by the host computer.

FIG. 10 is an explanatory diagram of the access request packet 300 according to the first embodiment of this invention which is transmitted to the storage system 100 by the host computer 102.

The packet 300 contains a MAC field 301, an IP field 302, a TCP header field 303, a payload field 304, and a cyclic redundancy check (CRC) field 305.

A MAC address of a transmission destination of the packet 300 is stored in the MAC field 301. According to this embodiment, MAC addresses of the logical access ports 902 and 903 of the storage system 100 are stored in the MAC field 301.

IP addresses of a transmission source and a transmission destination of the packet 300 are stored in the IP field 302. According to this embodiment, an IP address of the host computer 102 is stored as a transmission source in the IP field 302. IP addresses of the logical access ports 902 and 903 of the storage system 100 are stored as transmission destinations in the IP field 302.

A port number of a transmission destination of the packet 300 is stored in the TCP header field 303. According to this embodiment, port numbers of the logical access ports 902 and 903 of the storage system 100 are stored in the TCP header field 303.

Data transmitted through the packet 300 is stored in the payload field 304. In the payload field 304, iSCSI names of the logical ports 902 and 903 of the storage system 100 are stored. A reading or writing request is stored in the payload field 304. Further, an access destination LUN and an access destination LBA are stored in the payload field 304.

A CRC used for judging a packet transmission mistake is stored in the CRC field 305.

Figure 11:
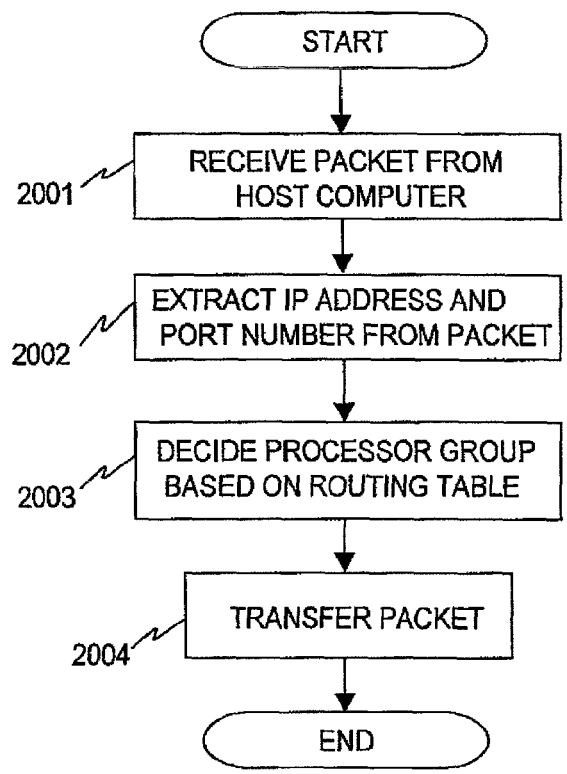
FIG. 11 is a flowchart showing an access request packet transfer process of the interface unit according to the first embodiment of this invention.

FIG. 11 is a flowchart showing an access request packet transfer process of the interface unit 104 according to the first embodiment of this invention.

The interface unit 104 receives an access request packet 300 from the host computer 102 (2001).

Then, the interface unit 104 extracts an IP address of a transmission destination from the IP field 302 of the received access request packet 300. The interface unit 104 extracts a port number of the transmission destination from the TCP header field 303 of the received access request packet 300 (2002). Further, the interface unit 104 extracts an access destination LUN and an access destination LBA from the payload field 304 of the received access request packet 300.

Next, the interface unit 104 refers to the routing table 605 to decide a processor group for processing the access request packet 300 (2003).

Specifically, the interface unit 104 selects, from the routing table 605, records each having the IP address 6051 of the routing table 605 that matches the extracted IP address of the transmission destination. Then, the interface unit 104 selects, from among the selected records, a record which has the port number 6052 of the routing table 605 that matches the extracted port number of the transmission destination.

Next, the interface unit 104 selects, from among the selected records, a record which has the LUN 6053 of the routing table 605 that matches the extracted access destination LUN. Then, the interface unit 104 selects, from among the selected records, a record which has the LBA 6054 of the routing table 605 that matches the extracted access destination LBA.

Subsequently, the interface unit 104 extracts a processor group ID 6055 and a transfer destination internal address 6056 from the selected record. The interface unit 104 decides a processor group identified by the extracted processor group ID 6055 as a processor group for processing the access request packet 300.

The interface unit 104 adds the extracted transfer internal address 6056 to the access request packet 300. Then, the interface unit 104 transfers the access request packet 300 to the processor group identified by the extracted processor group ID 6055 (2004).

Subsequently, the interface unit 104 finishes the access request packet transfer process.

Figure 12:
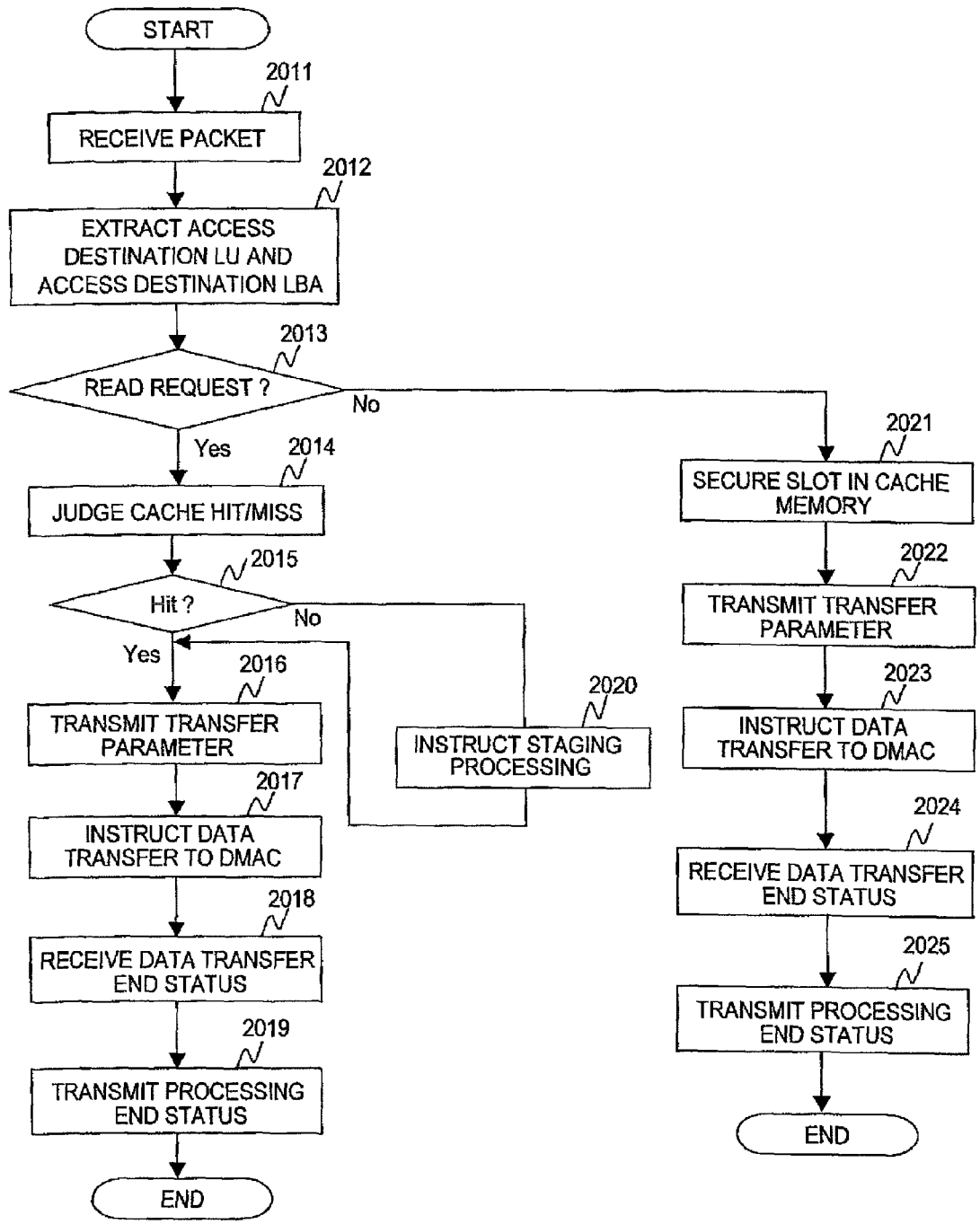
FIG. 12 is a flowchart showing an access request packet transfer process of the processor according to the first embodiment of this invention.

FIG. 12 is a flowchart showing an access request packet transfer process of the processor 109 according to the first embodiment of this invention.

The processor 109 receives an access request packet 300 from the interface unit 104 (2011).

The processor 109 extracts an access destination LUN and an access destination LBA from the payload field 304 of the received access request packet 300 (2012).

Then, the processor 109 judges whether the received access request packet 300 is a reading or writing request packet (2013).

When the access request packet 300 is a reading request packet, the processor 109 checks for a cache hit mistake based on the cache hit mistake judgment table 803 (2014). Accordingly, the processor 109 judges whether data requested to be read by the access request packet 300 has been stored or not in the cache memory 106.

If the data has been stored in the cache memory 106, the processor 109 judges as a cache hit (2015). The processor 109 creates a transfer parameter when the cache hit is judged. The transfer parameter is a parameter for transferring the data stored in the cache memory 106 to the host computer 102. Then, the processor 109 transmits the created transfer parameter to the DMAC 601 of the interface unit 104 (2016).

Next, the processor 109 instructs the DMAC 601 of the interface unit 104 to transfer the data stored in the cache memory 106 (2017).

Subsequently, the processor 109 stands by until a data transfer end status is received from the DMAC 601 of the interface unit 104, and receives the data transfer end status (2018). Then, the processor 109 transmits a processing end status of the access request packet 300 to the host computer 102 (2019).

After that, the processor 109 finishes the access request packet execution process.

On the other hand, it is judged in Step 2014 that the data has not been stored in the cache memory 106, the processor 109 judges as a cache mistake (2015). When a cache mistake is judged, the processor 109 secures a storage area (slot) for storing the data requested to be read by the access request packet 300 in the cache memory 106. Then, the processor 109 instructs the back-end interface unit 108 to execute staging processing (2020).

Having been instructed to execute the staging processing, the back-end interface unit 108 reads data requested to be read by the access request packet 300, from the hard disk drive 112. Then, the back-end interface unit 108 stores the read data in the slot secured in the cache memory 106.

The processor 109 stands by until the back-end interface unit 108 finishes the staging processing. In this case, the processor 109 may execute another processing. When the back-end interface unit 108 finishes the staging processing, the processor 109 executes Steps 2016 to 2019. Steps 2016 to 2019 are similar to the processing described, and thus description thereof will be omitted.

Then, the processor 109 finishes the access request execution process.

A case where the access request packet 300 is a writing request packet will be described. In this case, the processor 109 secures a storage area (slot) for storing data requested to be written by the access request packet 300 in the cache memory 106 (2021).

Next, the processor 109 creates a transfer parameter. The transfer parameter is for transferring data requested to be written by an access request packet 400 to the cache memory 106. The processor 109 transmits the created transfer parameter to the DMAC 601 of the interface unit 104 (2022).

Then, the processor 109 instructs the DMAC 601 of the interface unit 104 to transfer the data requested to be written by the access request packet 400 (2023).

Subsequently, the processor 109 stands by until a data transfer end status is received from the DMAC 601 of the interface unit 104, and receives the data transfer end status (2024). Then, the processor 109 transmits a processing end status of the access request packet 300 to the host computer 102 (2025).

After that, the processor 109 finishes the access request packet execution process.

Figure 13:
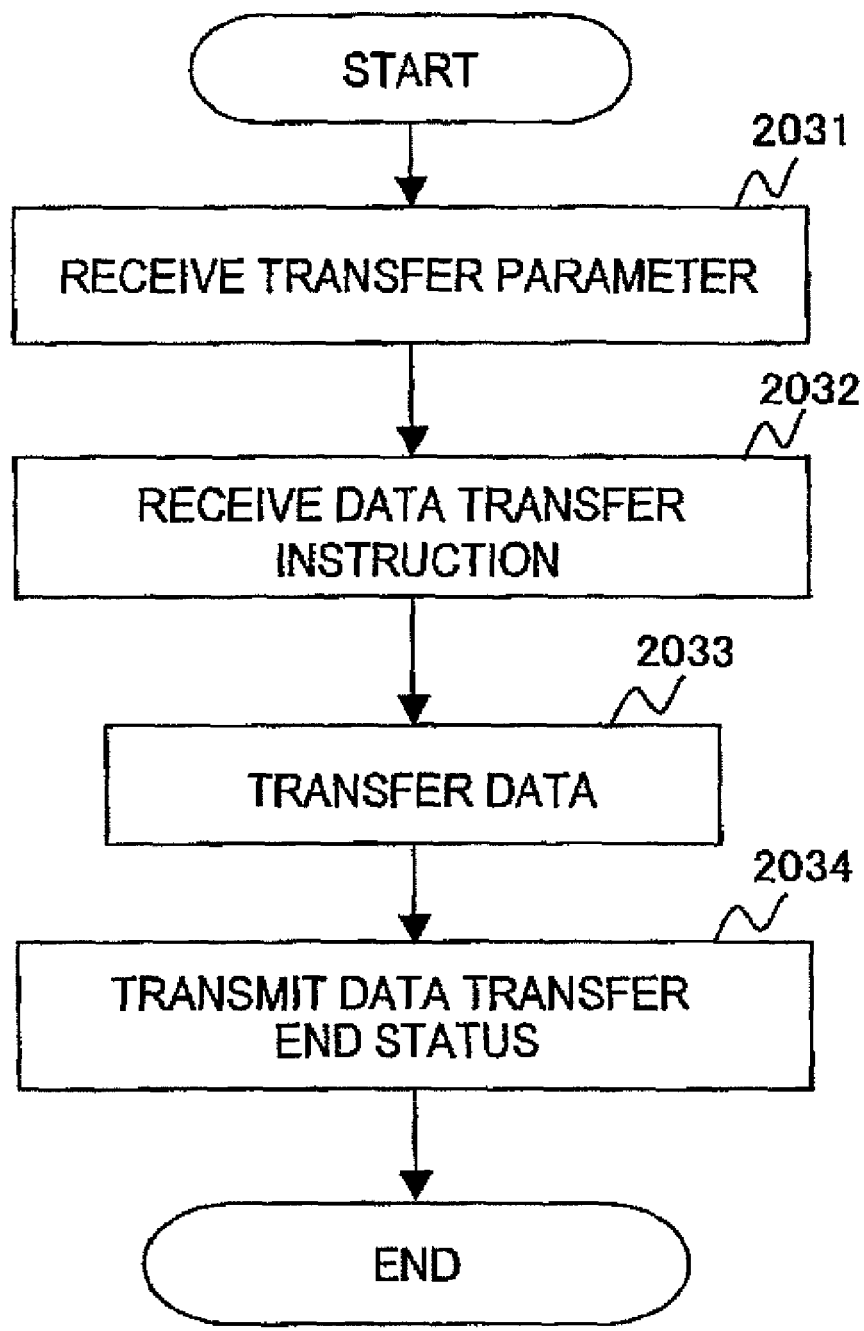
FIG. 13 is a flowchart showing a data transfer process of the interface unit according to the first embodiment of this invention.

FIG. 13 is a flowchart showing a data transfer process of the interface unit 104 according to the first embodiment of this invention.

The DMAC 601 of the interface unit 104 receives the transfer parameter from the processor 109 (2031). The DMAC 601 of the interface unit 104 stores the received transfer parameter in the memory 603.

Next, the DMAC 601 of the interface unit 104 receives a data transfer instruction from the processor 109 (2032). The DMAC 601 of the interface unit 104 transfers data based on the transfer parameter stored in the memory 603 (2033).

For example, the DMAC 601 of the interface unit 104 transfers the data stored in the cache memory 106 to the host computer 102. The DMAC 601 of the interface unit 104 transfers the data requested to be written from the host computer 102 to the cache memory 106.

Upon an end of the data transfer, the DMAC 601 of the interface unit 104 transmits a data transfer end status to the processor 109 (2034). Then, the interface unit 104 finishes the data transfer process.

According to the first embodiment of this invention, the interface unit 104 transmits access requests to the processors 109 corresponding to the logical access ports 902 and 903. Further, the interface unit 104 refers to the access destination LUN and the access destination LBA to transfer the access request to the processor 109. In other words, the interface unit 104 transfers the access request to a proper processor 109. Thus, the storage system 100 of the first embodiment of this invention can efficiently use a capacity of the processor 109. Furthermore, the storage system 100 of the first embodiment of this invention can reduce an amount of communication on the internal network 116.

Second Embodiment

According to a second embodiment of this invention, a SAN 103 is formed of a fibre channel.

A configuration of a computer system of the second embodiment of this invention is similar to that of the computer system of the first embodiment shown in FIG. 1, except for a logical access port configuration table 1201 stored in a processor unit 107 and a routing table 605 stored in an interface unit 104. Description of the same components will be omitted.

FIG. 14 is a diagram showing a structure of the logical access port configuration table 1201 stored in the processor unit 107 of the second embodiment of this invention.

The logical access port configuration table 1201 contains a logical access port ID 12011, a World Wide Name (WWN) 12016, and a port address 12017.

The logical access port ID 12011 is an identifier for uniquely identifying each of the logical access ports 902 and 903 in the storage system 100.

The WWN 12016 is WWN of each of logical access ports 902 and 903 identified by the logical access port ID 12011 of a relevant record. The port address 12017 is a port address of each of the logical access ports 902 and 903 identified by the logical access port ID 12011 of the record.

FIG. 15 is a diagram showing a structure of the routing table 605 stored in the interface unit 104 of the second embodiment of this invention.

The routing table 605 contains a port address 6057, a WWN 6058, an LUN 6053, an LBA 6054, a processor group ID 6055, and a transfer destination internal address 6056.

The LUN 6053, the LBA 6054, the processor group ID 6055, and the transfer destination internal address 6056 are identical to those contained in the routing table of the first embodiment shown in FIG. 9. Similar components will be denoted by similar reference numerals, and description thereof will be omitted.

The port address 6057 is a port address of each of the logical access ports 902 and 903. The WWN 6058 is WWN of each of the logical access ports 902 and 903.

The computer system of the second embodiment of this invention uses WWN or a port ID in place of an IP address and a port number in all processing. Other processing of the computer system according to the second embodiment of this invention is similar to that of the computer system of the first embodiment shown in FIGS. 11 to 13. Thus, description of the processing of the computer system of the second embodiment will be omitted.

Third Embodiment

According to a third embodiment of this invention, data requested to be written/read is communicated between interface units without being stored in a cache memory.

Figure 16:
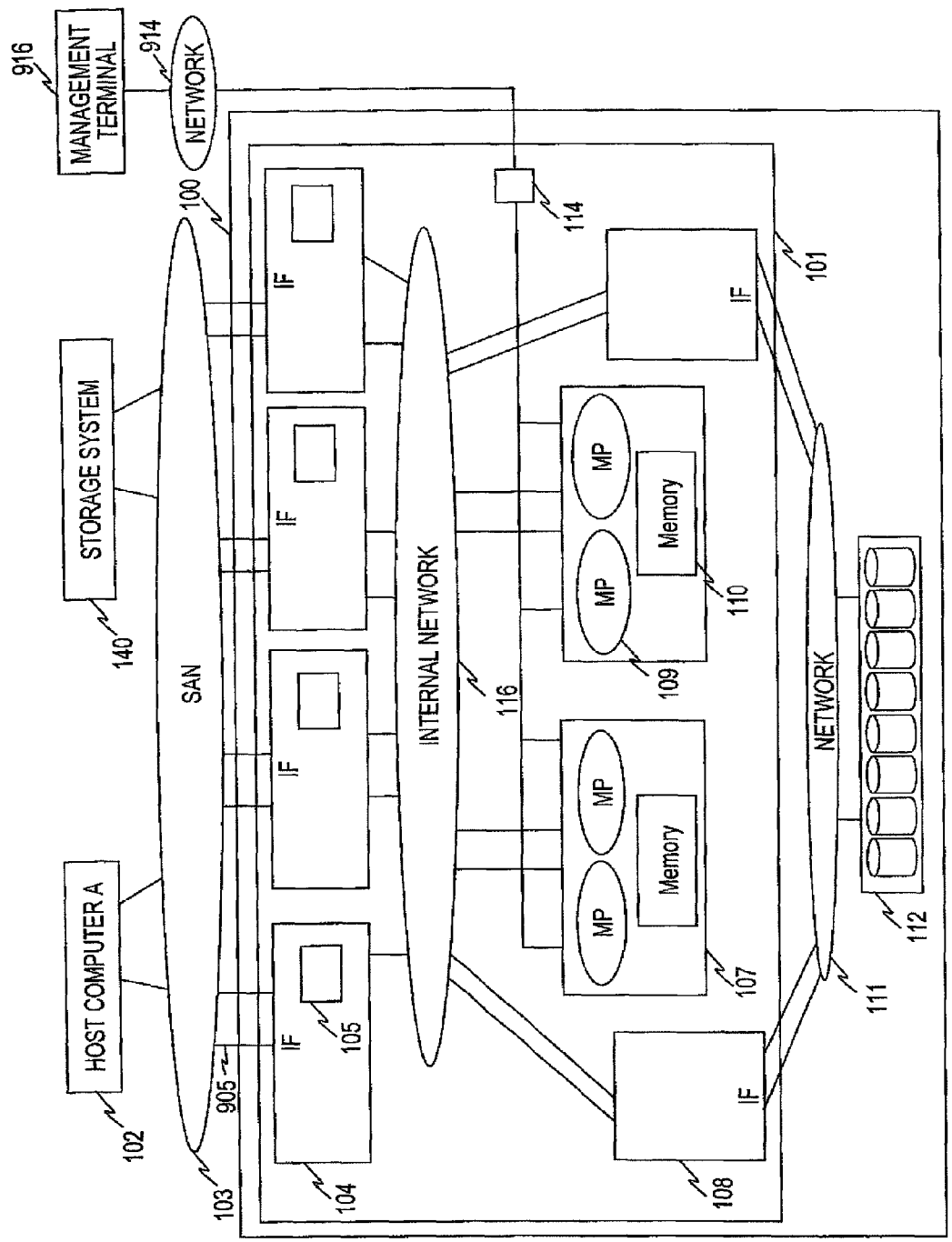
FIG. 16 is a block diagram showing a configuration of a computer system according to the third embodiment of this invention.

FIG. 16 is a block diagram showing a configuration of a computer system according to the third embodiment of this invention.

In the computer system according to the third embodiment of this invention, a storage system 140 is connected to a SAN 103. The storage system 100 includes no cache memory. A processor unit 107 of the storage system 100 stores a logical device management table. A configuration of a routing table 605 stored in an interface unit 104 of the storage system 100 is different from that of the first embodiment.

Other components of the computer system according to the third embodiment of this invention are identical to those of the computer system of the second embodiment shown in FIG. 1. Similar components will be denoted by similar reference numerals, and description thereof will be omitted.

The storage system 140 includes a storage controller and a hard disk drive. The hard disk drive stores data requested to be written by a host computer 102. The storage controller reads/writes date from/to the hard disk drive.

According to this embodiment, the storage system 140 provides the storage system 100 with a storage area of the hard disk drive as a logical volume. The storage system 100 provides the host computer 102 with the logical volume, which is provided to the storage system 140, as a logical volume of the storage system 100.

A logical device management table is information regarding a structure of a storage area present outside the storage system 100. Referring to FIG. 17, the logical device management table will be described in detail.

FIG. 17 is a diagram showing a structure of a logical device configuration management table 1901 stored in the processor unit 107 of the third embodiment of this invention.

The logical device configuration management table 1901 contains a logical device ID 19011, an external storage ID 19012, an access port ID 19013, and an access destination LUN 19014.

The logical device ID 19011 is a unique identifier of a storage area (logical device) present outside the storage system 100. According to this embodiment, the logical device ID 19011 is an identifier for uniquely identifying a logical volume (LU) disposed in the external storage system 140, by the storage system 100.

The external storage ID 19012 is a unique identifier of the storage system 140 which includes the logical volume identified by the logical device ID 19011.

The access port ID 19013 is a unique identifier of a physical port 905 used for accessing the logical volume identified by the logical device ID 19011. The access destination LUN 19014 is an identifier for uniquely identifying the logical volume identified by the logical device ID 19011, by the external storage system 140.

FIG. 18 is a diagram showing a structure of a routing table 605 stored in the interface unit 104 of the third embodiment of this invention.

The routing table 605 contains a port address 6057, a WWN 6058, an LUN 6053, an LBA 6054, a processor group ID 6055, a transfer destination internal address 6056, a logical device ID 6059, an external storage ID 6060, an access destination LUN 6061, and an access port ID 6062.

The port address 6057, the WWN 6058, the LUN 6053, the LBA 6054, the processor group ID 6055, and the transfer destination internal address 6056 are identical to those contained in the routing group of the second embodiment shown in FIG. 15. Similar components will be denoted by similar reference numerals, and description thereof will be omitted.

The logical device ID 6059 is a unique identifier of a logical device accessed from each of the logical access ports 902 and 903 identified by the port address 6057 and the WWN 6058 of the record.

The external storage ID 6060 is a unique identifier of the external storage system 140 equipped with a logical volume identified by the logical device ID 6059 of the record. The access destination LUN 6061 is an identifier for uniquely identifying the logical volume identified by the logical device ID 6059 of the record, by the external storage system 140. The access port ID 6062 is a unique identifier of the physical port 905 used for accessing the logical volume identified by the logical device ID 6059 of the record.

Next, processing of creating or updating a routing table 605 will be described.

The processor unit 107 creates or updates a routing table 605 based on the logical access port configuration table 1201 shown in FIG. 14, the logical access port-processor mapping table 1301 shown in FIG. 6, the logical access port-physical port mapping table 1401 shown in FIG. 7, the volume management table 1801 shown in FIG. 8, and the logical device management table 1901 shown in FIG. 17.

Specifically, the processor unit 107 specifies a logical access port whose information is updated. Next, the processor unit 107 selects a record where an identifier of the specified logical access port matches a logical access port ID 12011 of the logical access port configuration table 1201 from the same. The processor unit 107 extracts a WWN 12016 and a port address 12017 from the selected record.

The processor unit 107 stores the extracted port address 12017 in the port address 6057 of the routing table 605. Further, the processor unit 107 stores the extracted WWN 12016 in the WWN 6058 of the routing table 605.

The processor unit 107 selects a record where the identifier of the specified logical access port matches a logical access port ID 18011 of the volume management table 1801 from the same. Then, the processor unit 107 extracts an LUN 18012, a logical device ID 18013 and an LBA 18014 from the selected record.

The processor unit 107 stores the extracted LUN 18012 in the LUN 6053 of the routing table 605. Then, the processor unit 107 stores the extracted LBA 18014 in the LBA 6054 of the routing table 605. The processor unit 107 stores the extracted logical device ID 18013 in the logical device ID 6059 of the routing table 605.

Subsequently, the processor unit 107 selects a record where the identifier of the specified logical access port matches a logical access port ID 13011 of the logical access port-processor mapping table 1301 from the same. The processor unit 107 extracts a processor group ID 13012 and an internal address 13013 from the selected record.

The processor unit 107 stores the extracted processor group ID 13012 in the processor ID 6055 of the routing table 605. The processor unit 107 stores the extracted internal address 13013 in the transfer destination internal address 6056 of the routing table 605.

Subsequently, the processor unit 107 selects a record where the extracted logical device ID 18013 matches a logical device ID 19011 of the logical device management table 1901 from the same. The processor unit 107 extracts an external storage ID 19012, an access port ID 19013, and an access destination LUN 19014 from the selected record.

The processor unit 107 stores the extracted external storage ID 19012 in the external storage ID 6060 of the routing table 605. Then, the processor unit 107 stores the extracted access destination LUN 19014 in the access destination LUN 6061 of the routing table 605. The processor unit 107 stores the access port ID 19013 in the access port ID 6062 of the routing table 605.

However, when the processor unit 107 cannot select a record where the extracted logical device ID 18013 matches the logical device ID 19011 of the logical device management table 1901, the processor unit 107 does not store any values in the external storage ID 6060, the access destination LUN 6061, and the access port ID 6062 of the routing table 605.

As described above, the processor unit 107 updates or creates the routing table 605 stored in the interface unit 104.

Next, processing performed when the storage system 100 receives an access request packet 300 from the host computer 102 will be described.

Figure 19:
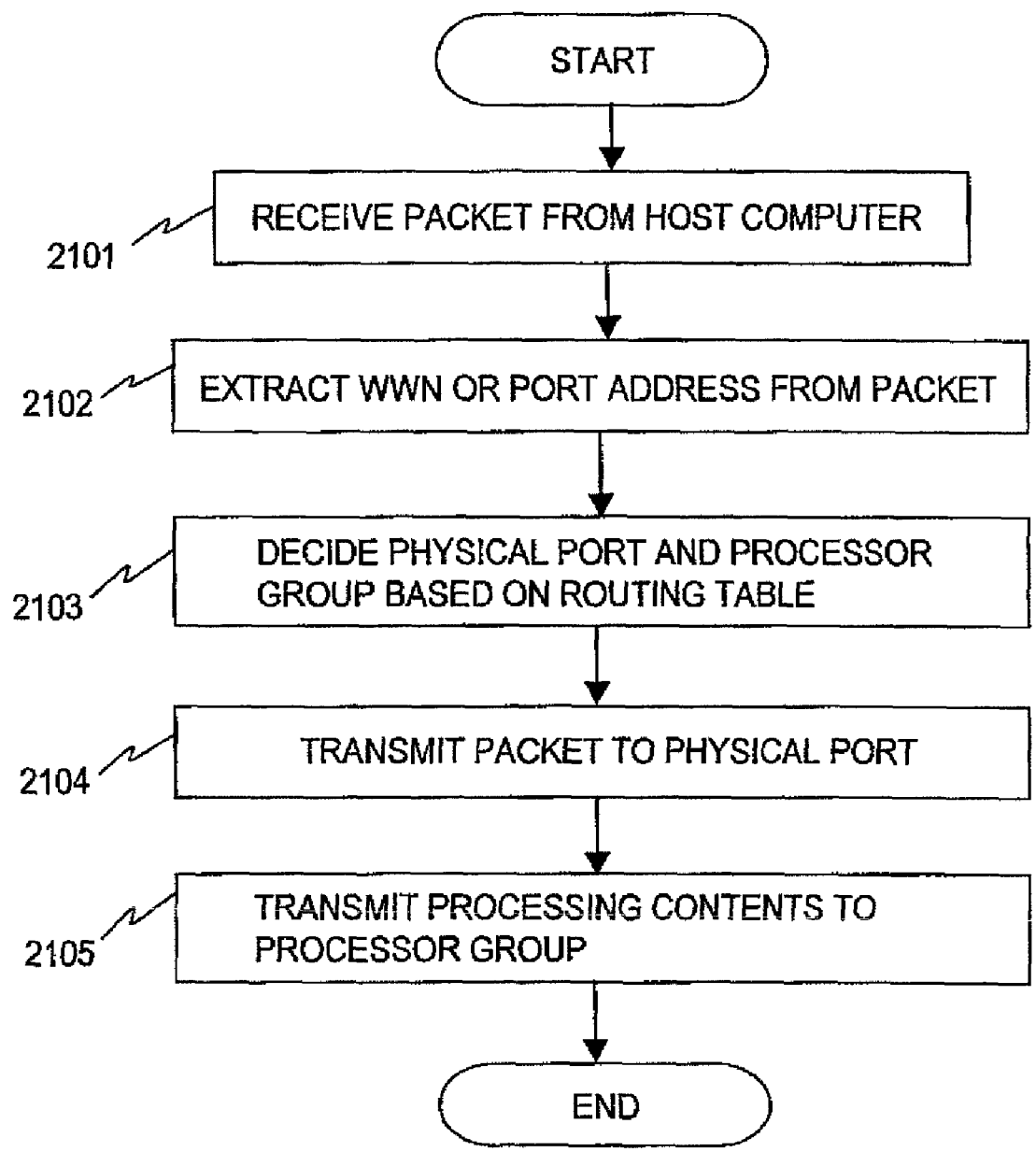
FIG. 19 is a flowchart showing an access request packet transfer process of the interface unit according to the third embodiment of this invention.

FIG. 19 is a flowchart showing an access request packet transfer process of the interface unit 104 according to the third embodiment of this invention.

The interface unit 104 receives an access request packet from the host computer 102 (2101).

Then, the interface unit 104 extracts a WWN and a port address of a transmission destination from the received access request packet (2102). The interface unit 104 further extracts an access destination LUN and an access destination LBA from the received access request packet.

Next, the interface unit 104 selects, from the routing table 605, records where the extracted port address of the transmission destination matches the port address 6057 of the routing table 605. Then, the interface unit 104 selects records where the WWN of the transmission destination matches the WWN 6058 of the routing table 605 from the selected records.

Then, the interface unit 104 selects, from the selected records, records where the extracted access destination LUN matches the LUN 6053 of the routing table 605 from the selected records. Then, the interface unit 104 selects a record where the access destination LBA matches the LBA 6054 of the routing table 605 from the selected records.

The interface unit 104 extracts a processor group ID 6055, a transfer destination internal address 6056, an access destination LUN 6061, and an access destination port ID 6062 from the selected record (2103).

Next, the interface unit 104 stores the extracted access destination LUN 6061 in the received access request packet. The interface unit 104 transmits the access request packet in which the access destination LUN 6061 is stored to the interface unit 104 equipped with a physical port 905 identified by the extracted access destination port ID 6062 (2104).

Further, the interface unit 104 transmits contents of the received access request packet and contents of routing processing to a processor group identified by the extracted processor group ID 6055 (2105). The contents of the routing processing contain an identifier of the physical port 905 which is a transmission destination of the access request packet, an identifier of the interface unit 104 equipped with the physical port 905, and the like.

Then, the interface unit 104 finishes the transfer processing of the access request packet received from the host computer 102.

Figure 20:
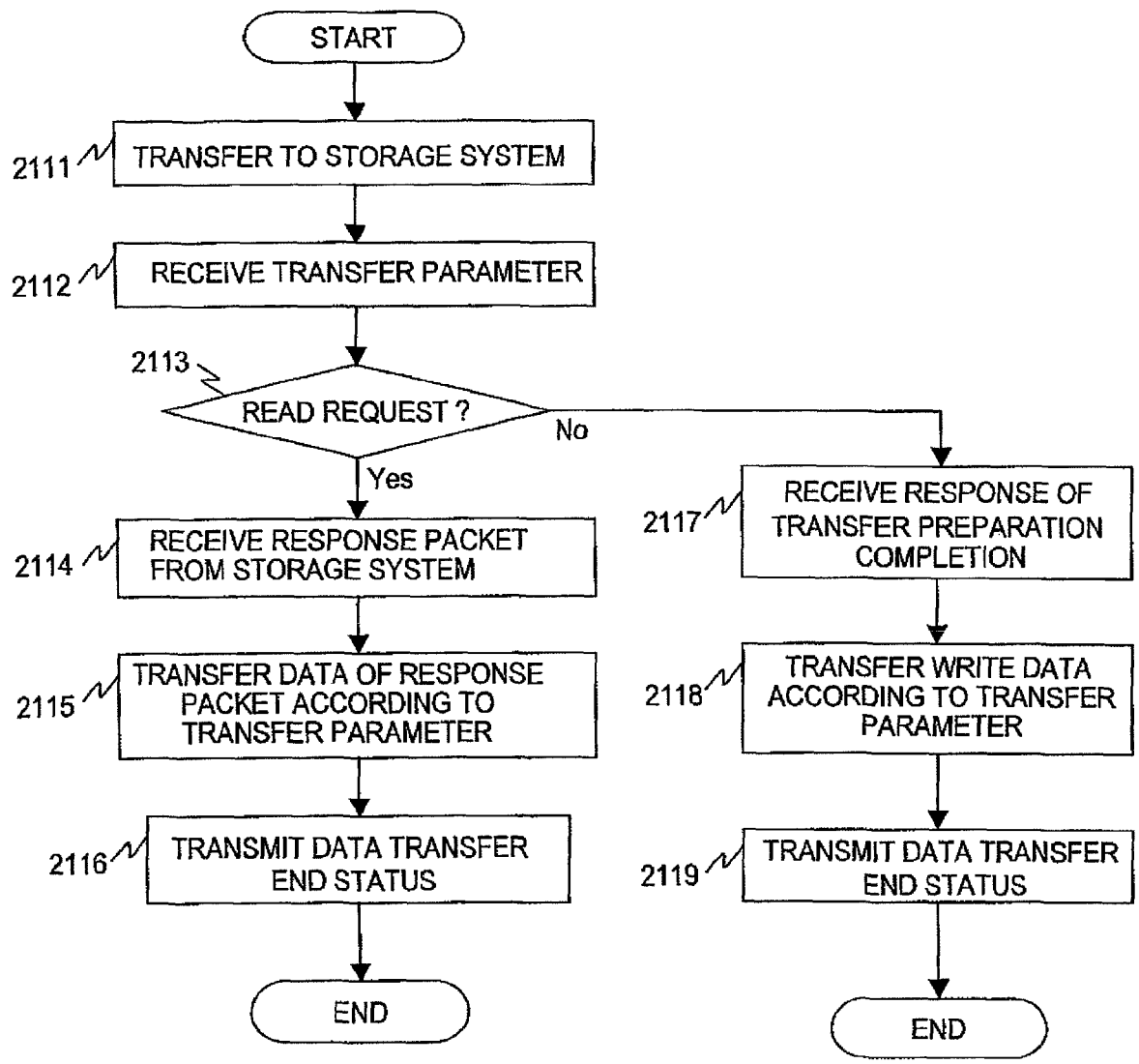
FIG. 20 is a flowchart showing processing of transferring an access request packet to the storage system by the interface unit according to the third embodiment of this invention.

FIG. 20 is a flowchart showing processing of transferring an access request packet to the storage system 140 by the interface unit 104 according to the third embodiment of this invention.

The interface unit 104 receives an access request packet from another interface unit 104. The interface unit 104 transfers the received access request packet to the storage system 140 (2111).

The interface unit 104 receives a transfer parameter from the processor 109. Then, the interface unit 104 stores the received transfer parameter in the memory 603 (2112).

Subsequently, the interface unit 104 judges whether the transferred access request packet is a reading request packet or a writing request packet (2113).

If the access request packet is a reading request packet, the interface unit 104 stands by until it receives a response packet from the storage system 140. Then, the interface unit 104 receives the response packet from the storage system 140 (2114).

The interface unit 104 transfers read data contained in the response packet to the host computer 102 based on the transfer parameter stored in the memory 603 (2115).

Then, the interface unit 104 receives a data transmission end status from the storage system 140. The interface unit 104 transmits a data transfer end status to the processor 109 (2116). The interface unit 104 then finishes the process.

On the other hand, if the access request packet is a writing request packet, the interface unit 104 stands by until it receives a notification of transfer preparation completion from the storage system 140. The interface unit 104 receives the notification of the transfer preparation completion from the storage system 140 (2117).

Then, the interface unit 104 transfers write data to the storage system 140 based on the transfer parameter stored in the memory 603 (2128).

Then, the interface unit 104 receives a data transmission end status from the storage system 140. The interface unit 104 transmits a data transfer end status to the processor 109 (2119). The interface unit 104 then finishes the process.

Figure 21:
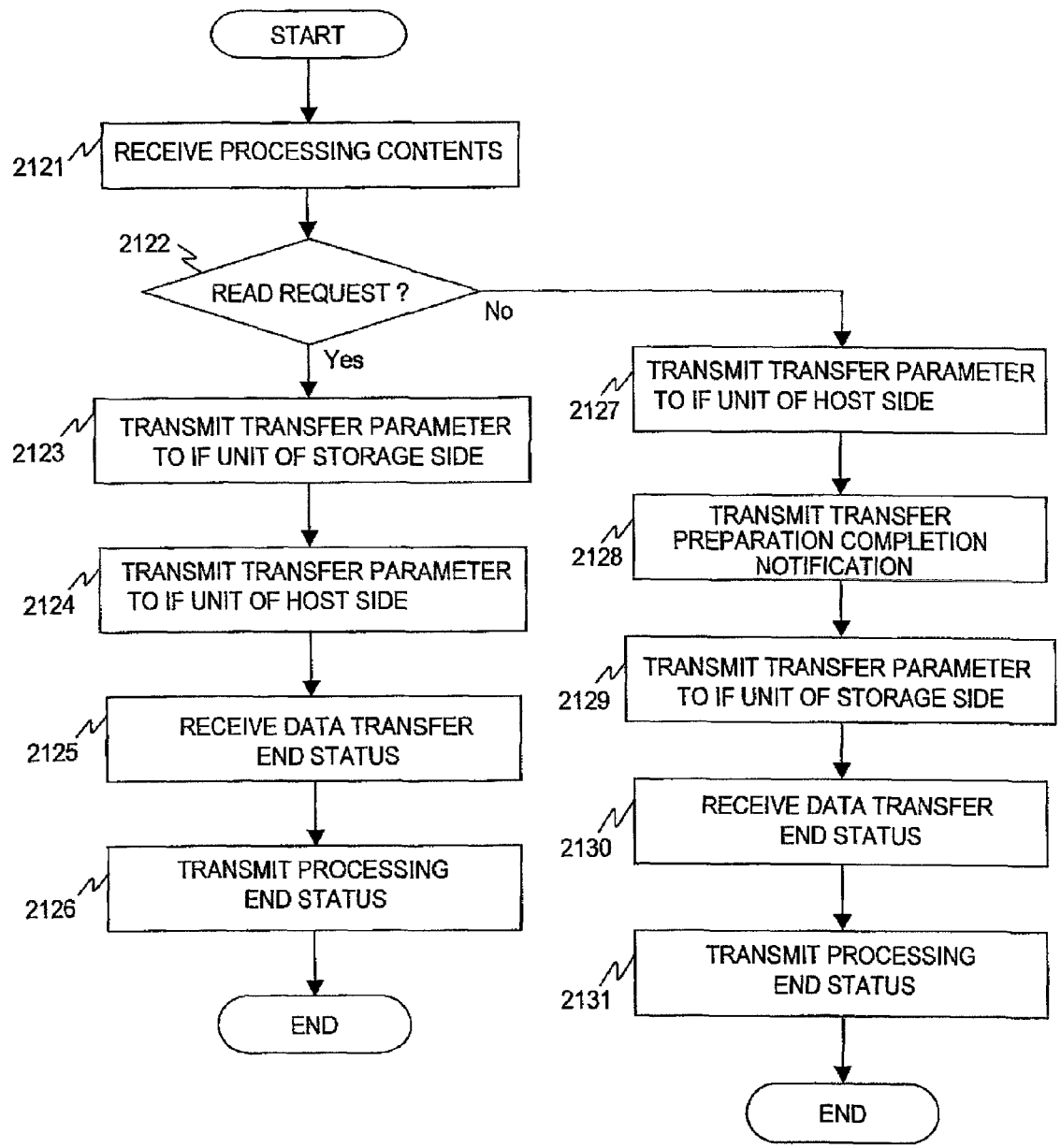
FIG. 21 is a flowchart showing processing of the processor according to the third embodiment of this invention.

FIG. 21 is a flowchart showing processing of the processor 109 according to the third embodiment of this invention.

The processor 109 receives contents of an access request packet and contents of routing processing from the interface unit 104 accessed from the host computer 102 (interface unit 104 of the host side) (2121).

Next, the processor 109 judges whether an access request packet corresponding to the received contents is a reading request packet or a writing request packet (2122).

If the access request packet is a reading request packet, the processor 109 creates a transfer parameter. The transfer parameter is a parameter for transferring read data from the storage system 140 to the host computer 102.

The processor 109 transmits the created transfer parameter to the interface unit 104 accessed from the storage system 140 (interface unit 104 of the storage side) (2123). Similarly, the processor 109 transmits the created transfer parameter to the interface unit 104 of the host side (2124).

Subsequently, the processor 109 stands by until it receives a data transfer end status from the interface unit 104 of the storage side. The processor 109 receives the data transfer end status from the interface unit 104 of the storage side (2125). The processor 109 transmits a processing end status of the access request packet 300 to the host computer 102 (2126). Then, the processor 109 finishes the process.

On the other hand, if the access request packet is a writing request packet, the processor 109 creates a transfer parameter. The transfer parameter is for transferring write data from the host computer 102 to the storage system 140.

The processor 109 transmits the created transfer parameter to the interface unit 104 of the host side (2127). The processor 109 transmits a notification of transfer preparation completion to the host computer 102 (2128). Then, the processor 109 transmits the created transfer parameter to the interface unit 104 of the storage side (2129).

Subsequently, the processor 109 stands by until it receives a data transfer end status from the interface unit 104 of the storage side. The processor 109 receives the data transfer end status from the interface unit 104 of the storage side (2130). The processor 109 transmits a processing end status of the access request packet 300 to the host computer 102 (2131). Then, the processor 109 finishes the process.

Fourth Embodiment

According to a fourth embodiment of this invention, the processor of the previous embodiments for controlling the logical port is changed.

According to a computer system of the fourth embodiment of this invention, a processor unit 107 stores a load management table. Other components of the computer system of the fourth embodiment of this invention are identical to those of the computer system of the first embodiment shown in FIG. 1. Description of the identical components will be omitted.

FIG. 22 is a diagram showing a structure of a load management table 2201 stored in the processor unit 107 according to the fourth embodiment of this invention.

The load management table 2201 manages a load of a processor 109. The load management table 2201 contains processor group ID 22011, a processing logical access port ID 22012, an activity ratio 22013, and a total activity ratio 22014.

The processor group ID 22011 is a unique identifier of a processor group including one or more processors 109.

The processing logical access port ID 22012 is a unique identifier of a logical access port where the processor group identified by the processor group ID 22011 of the record is being processed.

The activity ratio 22013 is an activity ratio of the processor group identified by the processor group ID 22011 of the record to process a logical access port identified by the processing logical access port ID 22012 of the record. The total activity ratio 22014 is an activity ratio of processor groups identified by the processor group ID 22011 of the record.

For example, when the total activity ratio 22014 of the load management table 2201 becomes equal to or more/less than a threshold value, the storage system 100 changes a processor group in charge of processing a logical access port. When a difference between maximum and minimum values of the total activity ratio 22014 of the load management table 2201 exceeds a threshold value, the storage system 100 may change the processor group in charge of processing the logical access port. Thus, the storage system 100 of this embodiment can equalize a load of the processor group.

The storage system 100 refers to a volume management table 1801 or the like to change the processor group in charge of processing the logical access port. Accordingly, the storage system 100 changes the processor group in charge of processing the logical access port to process related operations by one processor group. For example, when the storage system 100 executes copy processing of an LU (local mirror, remote mirror, snapshot, or JOURNAL saving), the storage system 100 changes the processor group in charge of processing the logical access port so that the same processor group can process a copy source LU and a copy destination LU.

The load management table 2201 may be stored not in the processor unit 107 but in another place such as a control unit 114.

For example, the storage system 100 is in a load state indicated by the load management table 2201 of this explanatory diagram. A total activity ratio 22014 of the processor group identified by a processor group ID 22011 of "0" is 20%. On the other hand, a total activity ratio 22014 of the processor group identified by a processor group ID 22011 of "1" is 80%. In other words, an activity ratio difference between these processor groups is 60%.

To correct this difference, the storage system 100 changes a processor group for controlling a logical access port identified by a logical access port ID of "3". Specifically, the storage system 100 transfers control of the logical access port from the processor group identified by the processor group ID 22011 of "1" to the processor group identified by the processor group ID 22011 of "0".

Now, transfer processing of the processor group for controlling the logical access port will be described.

Figure 23:
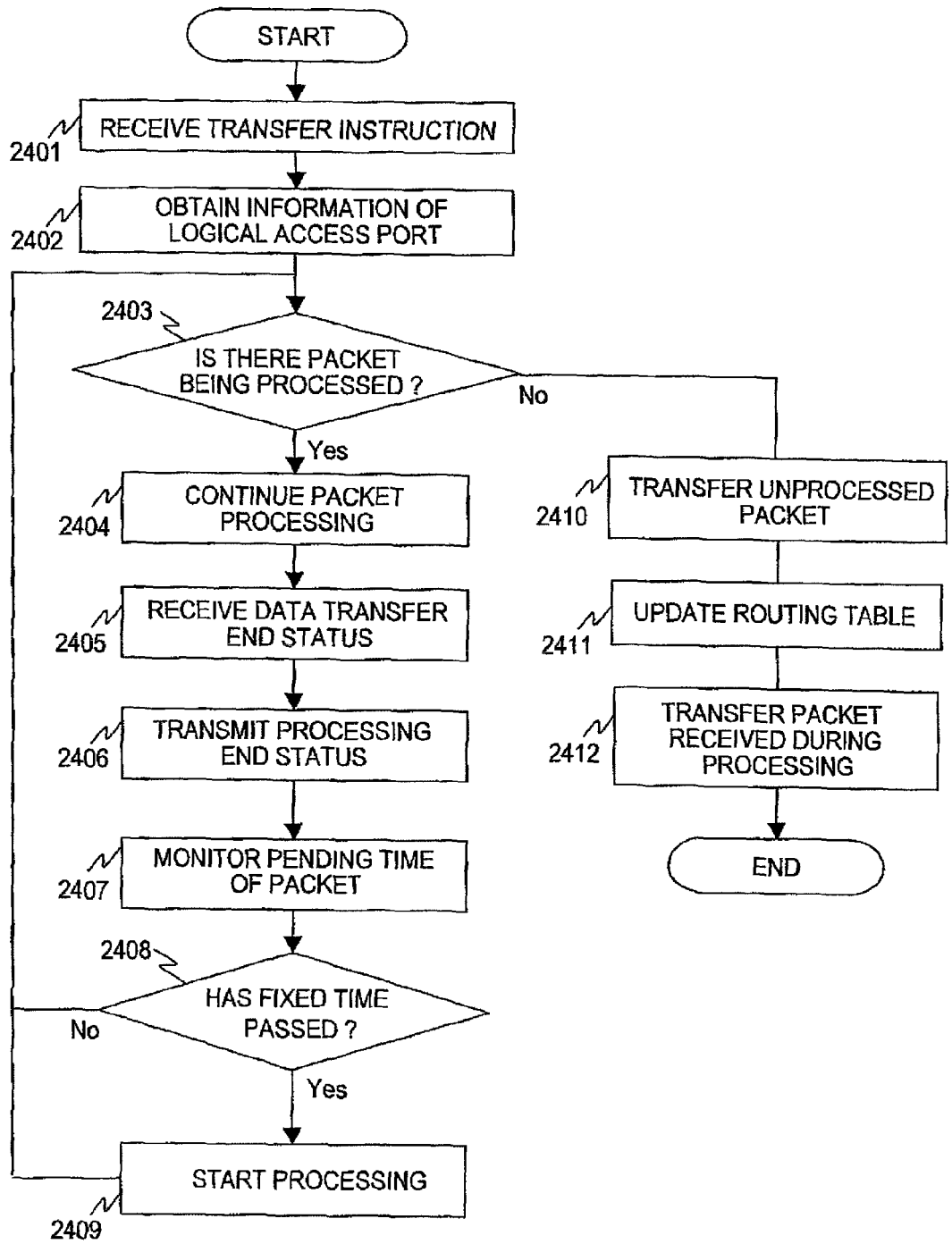
FIG. 23 is a flowchart showing transfer processing of the processor according to the fourth embodiment of this invention.

FIG. 23 is a flowchart showing transfer processing of the processor 109 according to the fourth embodiment of this invention.

The processor 109 included in a processor group which becomes a transfer source (processor 109 of transfer source) receives a transfer instruction from another processor 109, the control unit 114, or the like (2401). According to the transfer instruction, a logical access port to be transferred, a processor group serving as a transfer source, a processor group serving as a transfer destination, or the like is designated.

The processor 109 of the transfer source obtains information regarding the logical access port to be transferred (2402).

Specifically, the processor 109 of the transfer source obtains information regarding the logical access port to be transferred, from the logical access port configuration table 1201. The processor 109 of the transfer source specifies a physical port group corresponding to the logical access port to be transferred, from the logical access port-physical port mapping table 1401.

Next, the processor 109 of the transfer source transmits the obtained information to a processor 109 included in the processor group of the transfer destination (processor 109 of the transfer destination). The processor 109 of the transfer destination receives the information regarding the logical access port to be transferred. Then, the processor 109 of the transfer destination stores the received information in the logical access port configuration table 1201, the logical access port-physical port mapping table 1401, and the like.

Subsequently, the processor 109 of the transfer source judges whether there is an access request packet being processed or not (2403).

When there is an access request packet being processed, the processor 109 of the transfer source continues processing of the access request packet being processed (2404). Upon reception of a data transfer end status from the interface unit 104 (2405), the processor 109 of the transfer source judges completion of processing of the access request packet. Then, the processor 109 of the transfer source transmits a processing end status of the access request packet 300 to the host computer 102 (2406).

The processor 109 of the transfer source may transfer processing of all access request packets containing the access request packet being processed to the processor 109 of the transfer destination without continuing the processing of the access request packet being processed. In this case, the processor 109 of the transfer source notifies information containing a processing process or the like of the access request packet being processed to the processor 109 of the transfer destination.

Next, the processor 109 of the transfer source monitors time after reception of an access request packet stored in a queue of the memory 110 (pending time of the access request packet) (2407). The processor 109 of the transfer source judges whether there is an access request packet with a passage of fixed or more time after reception in the queue of the memory 110 (2408).

When there is no access request packet with a passage of fixed or more time in the queue, the processor 109 of the transfer source returns to Step 2403.

On the other hand, when there is an access request packet with a passage of fixed or more time in the queue, the processor 109 of the transfer source starts processing of the access request packet with the passage of fixed or more time (2409). Then, the processor 109 of the transfer source returns to Step 2403. Accordingly, time-over of the access request issued by the host computer 102 is prevented.

On the other hand, when there is no access request packet being processed in Step 2403, the processor 109 of the transfer source extracts an unprocessed access request packet from the queue of the memory 110. Then, the processor 109 of the transfer source transmits the extracted unprocessed access request packet to the processor 109 of the transfer destination (2410). The processor 109 of the transfer destination receives an unprocessed access request. The processor 109 of the transfer destination stores the received unprocessed access request in the queue of the memory 110 disposed in the processor 109 of the transfer destination.

Next, the processor 109 of the transfer source updates the routing table 605 stored in the interface unit 104.

Specifically, the processor 109 of the transfer source selects a record where an identifier of the logical access port to be transferred matches the logical access port ID 12011 of the logical access port configuration table 1201 from the same. The processor 109 of the transfer source extracts an IP address 12013 and a port number 12014 from the selected record.

Next, the processor 109 of the transfer source selects a record where the identifier of the logical access port to be transferred matches the logical access port ID 18011 of the volume management table 1801 from the same. Then, the processor 109 of the transfer source extracts an LUN 18012 and an LBA 18014 from the selected record.

Then, the processor 109 of the transfer source selects records where the extracted IP address 12013 matches the IP address 6051 of the routing table 605 from the same. Then, the processor 109 of the transfer source selects, from the selected records, records where the extracted port number 12014 matches the port number 6052 of the routing table 605.

Next, the processor 109 of the transfer source selects records where the extracted LUN 18012 matches the LUN 6053 of the routing table 605 from the selected records. Then, the processor 109 of the transfer source selects, from the selected records, a record where the extracted LBS 18014 matches the LBA 6054 of the routing table 605.

Then, the processor 109 of the transfer source stores the identifier of the processor group of the transfer destination in the processor group ID 6055 of the selected record. Further, the processor 109 stores an internal address of the processor group of the transfer destination in the transfer destination internal address 6056 of the selected record.

As described above, the processor 109 of the transfer source updates the routing table 605. Thus, the interface unit 104 transfers the access request packet to the processor 109 of the transfer destination.

The processor 109 of the transfer source may add a record after transfer to the routing table beforehand. In this case, the processor 109 of the transfer source sets the added record in an invalid state. Then, in Step 2411, the processor 109 of the transfer source sets the added record in a valid state.

The processor 109 of the transfer source may receive an access request packet during execution of transfer processing. In this case, the processor 109 of the transfer source transfers the received access request packet to the processor 109 of the transfer destination (2412). Then, the processor 109 of the transfer source finishes the process.

Fifth Embodiment

According to a fifth embodiment of this invention, a physical port 905 is restored from its fault.

A computer system of the fifth embodiment of this invention is identical to that of the first embodiment shown in FIG. 1. Thus, description thereof will be omitted.

A management terminal 916 of the fifth embodiment of this invention manages a physical connection relation of the computer system. For example, the management terminal 916 manages a connection relation between a physical port of the host computer 102 and a physical port of a switch device disposed in a SAN 103, and a connection relation between a physical port 905 of a storage system 100 and the physical port of the switch device disposed in the SAN 103.

The management terminal 916 can access the logical access port configuration table 1201, the logical access port-processor mapping table 1301, the logical access port-physical port mapping table 1401, the volume management table 1801, and the like. Further, the management terminal 916 can access information regarding a path stored in a path control unit disposed in the host computer 102.

Next, processing of the management terminal 916 performed when a fault occurs in the physical port 905 of the storage system 100 will be described.

Figure 24:
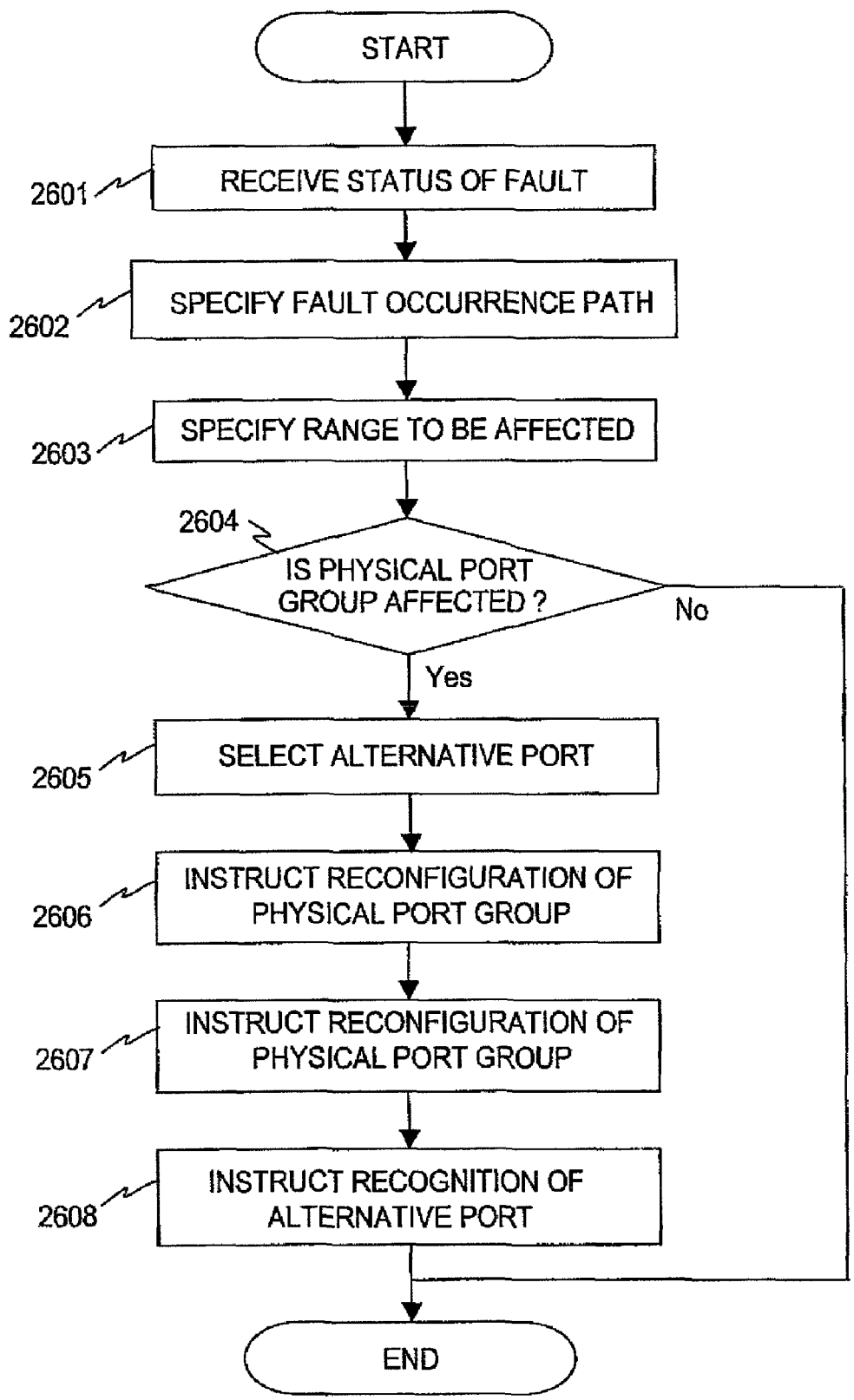
FIG. 24 is a flowchart showing a logical access port reconfiguration process of the management terminal according to the fifth embodiment of this invention.

FIG. 24 is a flowchart showing a logical access port reconfiguration process of the management terminal 916 according to the fifth embodiment of this invention.

The management terminal 916 receives a fault status from the storage system 100 or the switch device disposed in the SAN 103 (2601). Upon detection of a fault, the storage system 100 or the switch device notifies a status of the fault to the management terminal 916.

The management terminal 916 specifies a path of a fault occurrence based on the received fault status (2602).

The management terminal 916 refers to the physical connection relation of the computer system to specify a range to be affected by the fault (2603).

Next, the management terminal 916 refers to the logical access port configuration table 1201, the logical access port-processor mapping table 1301, and the logical access port-physical port mapping table 1401 to judge whether there is a physical port group included in the range to be affected by the fault. In other words, the management terminal 916 judges whether there is a physical port group to be affected by the fault (2604).

When there is no physical port group to be affected by the fault, the management terminal 916 does not need to reconfigure the logical access port. Thus, the management terminal 916 finishes the process.

On the other hand, when there is a physical port group to be affected by the fault, the management terminal 916 selects a physical port (alternative port) to replace the faulty physical port (faulty port) (2605). Specifically, the management terminal 916 selects an alternative port from physical ports physically connected to the host computer 102 through the switch device or the like.

Next, the management terminal 916 designates the faulty port and the alternative port, and instructs the processor unit 107 of the storage system 100 to reconfigure the physical port group affected by the fault (2606).

The processor unit 107 that has been instructed to reconfigure the physical port group updates the logical access port-physical port mapping table 1401. Accordingly, the processor unit 107 reconfigures the physical port group. The processor unit 107 updates the routing table 605 of the interface unit 104 based on the updated logical access port-physical port mapping table 1401.

Next, the management terminal 916 instructs the switch device to change a configuration of a port disposed in the switch device (2607). Then, to enable recognition of the alternative port from the host computer 102, the switch device changes the configuration of the port disposed in the switch device.

Then, the management terminal 916 instructs the host computer 102 to recognize the alternative port and the physical port group including the alternative port again (2608). The host computer 102 recognizes the alternative port and the physical port group including the alternative port again. Subsequently, the management terminal 916 finishes the logical access port reconfiguration process.

The logical access port reconfiguration process may be executed not by the management terminal 916 but by the processor 109 or the like.

As described above, according to the fifth embodiment of this invention, the management terminal 916 reconfigures the logical access port related to the faulty physical port. Thus, the storage system 100 of the fifth embodiment of this invention can reduce the effect of the fault of the physical path.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a host computer;
a plurality of disk drives; and
a storage controller, comprising a plurality of interfaces and a processor package;
wherein:
the plurality of interfaces includes at least one front end interface which couples to the host computer and the processor package and at least one back end interface which couples to the plurality of disk drives and the processor package, and
the front end interface is configured to store routing information including an identification of the processor package and a number of logical units provided by the plurality of disk drives and is configured to receive an access request from the host computer, determine a transfer destination of the processor package by referring to the access request and the routing information, and transfer the access request to the determined destination of the processor package, and
the processor package is configured to receive the access request from the front end interface, process the access request in cooperation with the disk drives via the back end interface, and transmit a processed result to the host computer in cooperation with the front end interface.

2. The computer system according to claim 1, wherein:
the plurality of interfaces comprise at least one physical port, the processor package comprises a logical access port, the routing information furthermore includes an identification of the logical access port, and
the logical access port is correlated to the physical port.

3. The computer system according to claim 2, wherein:
the host computer is coupled to the front end interface via a SAN-storage area network (SAN), and
the front end interface, the back end interface and the processor package are coupled to each other via an internal network.

4. The computer system according to claim 3, further comprising an external storage apparatus, wherein:
the processor package further comprises management information including identifiers of the external storage apparatus and an identifier of a number of logical units provided by the external storage apparatus,
the routing information further includes the identifier of the external storage apparatus and the identifiers of the number of logical units of the external storage apparatus, and
the processor package is configured to create and update the routing information based on the management information.

5. The computer system according to claim 4, wherein when determining the transfer destination, the front end interface extracts the identification of the logical access port.

6. The computer system according to claim 5, wherein the identification of the logical access port includes an address of the logical access port and World Wide Name (WWN).

7. A storage system, coupled to a host computer, comprising:
a plurality of disk drives; and
a storage controller, comprising a plurality of interfaces and a processor package;

wherein:
the plurality of interfaces includes at least one front end interface which couples to the host computer and the processor package and at least one back end interface which couples to the plurality of disk drives and the processor package, and the front end interface is configured to store routing information including an identification of the processor package and a number of logical units provided by the plurality of disk drives and is configured to receive an access request from the host computer, determine a transfer destination of the processor package by referring to the access request and the routing information, and transfer the access request to the determined transfer destination of the processor package, and the processor package is configured to receive the access request from the front end interface, process the access request in cooperation with the disk drives via the back end interface, and transmit a processed result to the host computer in cooperation with the front end interface.

8. The storage system according to claim 7, wherein
the plurality of interfaces comprise at least one physical port,
the processor package comprises a logical access port,
the routing information further includes an identification of the logical access port, and
the logical access port is correlated to the physical port.

9. The storage system according to claim 8, wherein
the host computer is coupled to the front end interface via a storage area network (SAN), and
the front end interface, the back end interface and the processor package are coupled to each other via an internal network.

10. The storage system according to claim 9, furthermore coupled to an external storage apparatus, wherein:
the processor package further comprises management information including identifiers of the external storage apparatus and an identifier of a number of logical units provided by the external storage apparatus,
the routing information further includes the identifiers of the external storage apparatus and the identifier of the number of logical units of the external storage apparatus, and
the processor package is configured to create and update the routing information based on the management information.

11. The storage system according to claim 10, wherein:
when determining the transfer destination, the front end interface extracts the identification of the logical access port.

12. The storage system according to claim 11, wherein the identification of the logical access port includes an address of the logical access port and World Wide Name (WWN).

* * * * *